United States Patent
Obiya et al.

(10) Patent No.: US 9,739,871 B2
(45) Date of Patent: Aug. 22, 2017

(54) TRANSMISSION-RECEPTION APPARATUS

(71) Applicant: Murata Manufacturing Co., Ltd., Kyoto (JP)

(72) Inventors: Hidenori Obiya, Kyoto (JP); Ryuken Mizunuma, Kyoto (JP); Shinya Mizoguchi, Kyoto (JP); Atsuyuki Yuasa, Kyoto (JP); Shinya Hitomi, Kyoto (JP); Hisao Hayafuji, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 327 days.

(21) Appl. No.: 14/681,163

(22) Filed: Apr. 8, 2015

(65) Prior Publication Data
US 2015/0212194 A1   Jul. 30, 2015

Related U.S. Application Data

(63) Continuation of application No. PCT/JP2013/076703, filed on Oct. 1, 2013.

(30) Foreign Application Priority Data

Oct. 17, 2012   (JP) .................................. 2012-229832

(51) Int. Cl.
  *G01S 13/02*   (2006.01)
  *G01S 7/02*   (2006.01)
  (Continued)

(52) U.S. Cl.
  CPC ............... *G01S 7/02* (2013.01); *G01S 7/038* (2013.01); *G01S 13/02* (2013.01); *H04B 1/525* (2013.01)

(58) Field of Classification Search
  CPC . G01S 13/02; G01S 7/02; G01S 7/038; H04B 1/525
  (Continued)

(56) References Cited

U.S. PATENT DOCUMENTS 8,111,646 B1 *  2/2012  Chang .................. H04B 7/0413
                                                    370/316
2006/0240769 A1  10/2006  Proctor, Jr. et al.

FOREIGN PATENT DOCUMENTS

JP    08-079126 A    3/1996
JP    2004-194097 A  7/2004
(Continued)

OTHER PUBLICATIONS

English translation of Written Opinion of the International Search Authority for Application No. PCT/JP2013/076703 dated Nov. 5, 2013.

*Primary Examiner* — Timothy A Brainard
(74) *Attorney, Agent, or Firm* — Pearne & Gordon LLP

(57) ABSTRACT

A reflected signal detector (12) detects the amplitude and the phase of a reflected signal and outputs detection signals. A control circuit (13) adjusts first control signals and second control signals on the basis of the detection signals. A first cancel signal output portion (9) adjusts a first cancel signal so that the first cancel signal has a phase opposite to that of the reflected signal and has the same amplitude as that of the reflected signal using the first control signals. A second cancel signal output portion (10) adjusts a second cancel signal so that the second cancel signal has a phase opposite to that of a leakage signal and has the same amplitude as that of the leakage signal using the second control signals. A combining portion (11) combines a reception signal including noise signals with the first and second cancel signals.

8 Claims, 14 Drawing Sheets

(51) Int. Cl.
*H04B 1/525* (2015.01)
*G01S 7/03* (2006.01)

(58) Field of Classification Search
USPC .......................................................... 342/175
See application file for complete search history.

(56) References Cited

FOREIGN PATENT DOCUMENTS

| JP | 2010-062997 A | 3/2010 |
| JP | 2011-055078 A | 3/2011 |

\* cited by examiner

| AMPLITUDE OF REFLECTED SIGNAL N1 | AMPLITUDE OF FIRST CANCEL SIGNAL NCa | | | PHASE OF REFLECTED SIGNAL N1 | PHASE OF FIRST CANCEL SIGNAL NCa | | |
|---|---|---|---|---|---|---|---|
| | $T_1$ | $T_2$ | $T_3$ | | $T_1$ | $T_2$ | $T_3$ |
| $A_1$ | $Aa_{11}$ | $Aa_{21}$ | $Aa_{31}$ | $\theta_1$ | $\theta a_{11}$ | $\theta a_{21}$ | $\theta a_{31}$ |
| $A_2$ | $Aa_{12}$ | $Aa_{22}$ | $Aa_{32}$ | $\theta_2$ | $\theta a_{12}$ | $\theta a_{22}$ | $\theta a_{32}$ |
| $A_3$ | $Aa_{13}$ | $Aa_{23}$ | $Aa_{33}$ | $\theta_3$ | $\theta a_{13}$ | $\theta a_{23}$ | $\theta a_{33}$ |
| ⋮ | ⋮ | ⋮ | ⋮ | ⋮ | ⋮ | ⋮ | ⋮ |
| $A_n$ | $Aa_{1n}$ | $Aa_{2n}$ | $Aa_{3n}$ | $\theta_m$ | $\theta a_{1m}$ | $\theta a_{2m}$ | $\theta a_{3m}$ |

| AMPLITUDE OF REFLECTED SIGNAL N1 | AMPLITUDE OF SECOND CANCEL SIGNAL NCb | | | PHASE OF REFLECTED SIGNAL N1 | PHASE OF SECOND CANCEL SIGNAL NCb | | |
|---|---|---|---|---|---|---|---|
| | $T_1$ | $T_2$ | $T_3$ | | $T_1$ | $T_2$ | $T_3$ |
| $A_1$ | $Ab_{11}$ | $Ab_{21}$ | $Ab_{31}$ | $\theta_1$ | $\theta b_{11}$ | $\theta b_{21}$ | $\theta b_{31}$ |
| $A_2$ | $Ab_{12}$ | $Ab_{22}$ | $Ab_{32}$ | $\theta_2$ | $\theta b_{12}$ | $\theta b_{22}$ | $\theta b_{32}$ |
| $A_3$ | $Ab_{13}$ | $Ab_{23}$ | $Ab_{33}$ | $\theta_3$ | $\theta b_{13}$ | $\theta b_{23}$ | $\theta b_{33}$ |
| ⋮ | ⋮ | ⋮ | ⋮ | ⋮ | ⋮ | ⋮ | ⋮ |
| $A_n$ | $Ab_{1n}$ | $Ab_{2n}$ | $Ab_{3n}$ | $\theta_m$ | $\theta b_{1m}$ | $\theta b_{2m}$ | $\theta b_{3m}$ |

TRANSMISSION-RECEPTION APPARATUS

FIELD OF THE INVENTION

The present invention relates to a transmission-reception apparatus that combines a reception signal with a cancel signal to reduce a noise signal.

DESCRIPTION OF THE RELATED ART

Transmission-reception apparatuses in the related art are known (for example, refer to Patent Document 1). In the transmission-reception apparatuses, antennas, transmission circuits, and reception circuits are connected via circulators. The transmission-reception apparatuses combine reception signals with cancel signals to remove reflected signals from the antennas and leakage signals from the circulators.

Patent Document 1: Japanese Unexamined Patent Application Publication No. 8-79126

BRIEF SUMMARY OF THE INVENTION

The configuration in Patent Document 1 is applied to apparatuses, such as radar apparatuses, using transmission signals and reception signals of the same frequencies. In this case, free spaces are often ensured around the antennas and the impedances of the antennas are substantially constant. Accordingly, variation in the reflected signals is not considered in the transmission-reception apparatus described in Patent Document 1.

In contrast, for example, in cellular phones and mobile terminals, user's hands or the likes are likely to come close to the antennas and the impedances of the antennas are varied depending on the usage states. In addition to variation in amplitude and phase of the reflected signals, the characteristics of the circulators may also be varied in association with the variation in impedance of the antennas. Consequently, there is a problem in that noise signals including the reflected signals and the leakage signals are not sufficiently reduced without taking the variation in impedance of the antennas into consideration.

In order to solve the above problem, it is an object of the present invention to provide a transmission-reception apparatus capable of reducing a noise signal in consideration of variation in impedance of an antenna.

(1) The present invention provides a transmission-reception apparatus including a transmission circuit; a reception circuit; an antenna; an antenna sharing device via which the antenna is connected to the transmission circuit and the reception circuit; a reflected signal detecting unit that is provided between the antenna sharing device and the antenna and that detects a reflected signal of a transmission signal from the antenna, the transmission signal being output from the transmission circuit; a dividing unit that is provided between the antenna sharing device and the transmission circuit and that extracts a signal from the transmission signal; a cancel signal output circuit that includes a first cancel signal output portion and a second cancel signal output portion, the first cancel signal output portion outputting a first cancel signal used to cancel the reflected signal of the transmission signal from the antenna on the basis of the signal extracted by the dividing unit, the second cancel signal output portion outputting a second cancel signal used to cancel a leakage signal of the transmission signal from the antenna sharing device on the basis of the signal extracted by the dividing unit; a combining unit that is provided between the antenna sharing device and the reception circuit and that combines the first cancel signal and the second cancel signal with a reception signal to be input into the reception circuit; and a control circuit that controls at least one of the first cancel signal output portion and the second cancel signal output portion. The control circuit adjusts amplitudes and phases of the first cancel signal and the second cancel signal or the amplitude and the phase of at least one of the first cancel signal and the second cancel signal on the basis of an amplitude and a phase of the reflected signal detected by the reflected signal detecting unit.

According to the present invention, when the control circuit adjusts the amplitude and the phase of the first cancel signal on the basis of the amplitude and the phase of the reflected signal, the first cancel signal can be adjusted in accordance with the variation in phase and amplitude of the reflected signal. As a result, even if the amplitude and the phase of the reflected signal are varied with the variation in impedance of the antenna, the phase and the amplitude of the first cancel signal can be adjusted so that the first cancel signal has a phase opposite to that of the reflected signal and has the same amplitude as that of the reflected signal, thereby removing the reflected signal.

In addition, the impedance of the antenna sharing device is varied with the variation in impedance of the antenna and the phase and the amplitude of the leakage signal of the transmission signal from the antenna sharing device also tend to be varied. Here, the amplitude and the phase of the reflected signal are varied and the amplitude and the phase of the leakage signal are also varied in accordance with the variation in impedance of the antenna, so that certain relationship is established between the variation of the reflected signal and the variation of the leakage signal. Accordingly, when the control circuit adjusts the amplitude and the phase of the second cancel signal on the basis of the amplitude and the phase of the reflected signal, the second cancel signal can be adjusted in accordance with the variation in amplitude and phase of the leakage signal. As a result, the phase and the amplitude of the second cancel signal can be adjusted so that the second cancel signal has a phase opposite to that of the leakage signal and has the same amplitude as that of the leakage signal even if the amplitude and the phase of the leakage signal are varied, thereby removing the leakage signal.

(2) In the present invention, the control circuit adjusts the amplitude and the phase of the first cancel signal on the basis of the amplitude and the phase of the reflected signal. The second cancel signal output portion outputs the second cancel signal that is set so as to have a predetermined amplitude and a predetermined phase.

According to the present invention, since the control circuit adjusts the amplitude and the phase of the first cancel signal on the basis of the amplitude and the phase of the reflected signal, the phase and the amplitude of the first cancel signal can be adjusted so that the first cancel signal has a phase opposite to that of the reflected signal and has the same amplitude as that of the reflected signal even if the impedance of the antenna is varied. The second cancel signal output portion outputs the second cancel signal that is set so as to have a predetermined amplitude and a predetermined phase. Here, the width of variation of the leakage signal is smaller than that of the reflected signal even when the impedance of the antenna is varied. Accordingly, the second cancel signal output portion sets the amplitude and the phase of the second cancel signal so that the second cancel signal has a phase opposite to that of, for example, the average leakage signal and has the same amplitude as that of the average leakage signal. This allows the leakage signal to be reduced.

(3) In the present invention, the dividing unit includes a first divider and a second divider, generates the first cancel signal on the basis of a signal extracted from the transmission signal via the first divider, and generates the second cancel signal on the basis of a signal extracted from the transmission signal via the second divider.

According to the present invention, the dividing unit includes the first divider and the second divider. Accordingly, the first cancel signal output portion is capable of generating the first cancel signal on the basis of the signal extracted from the transmission signal via the first divider. The second cancel signal output portion is capable of generating the second cancel signal on the basis of the signal extracted from the transmission signal via the second divider.

(4) In the present invention, the dividing unit is composed of a single divider and generates the first cancel signal and the second cancel signal on the basis of a signal extracted from the transmission signal via the divider.

According to the present invention, the dividing unit composed of the signal divider. Accordingly, the first cancel signal output portion is capable of generating the first cancel signal on the basis of the signal extracted from the transmission signal via the divider. The second cancel signal output portion is capable of generating the second cancel signal on the basis of the signal extracted from the transmission signal via the divider.

(5) In the present invention, the transmission-reception apparatus further includes a transmission-side tunable filter that is provided between the dividing unit and the transmission circuit and that selectively passes a transmission signal within one frequency band, among the transmission signals within a plurality of frequency bands; and a reception-side tunable filter that is provided between the combining unit and the reception circuit and that selectively passes a reception signal within one frequency band, among the reception signals within a plurality of frequency bands.

According to the present invention, since the transmission-side tunable filter is provided between the dividing unit and the transmission circuit, the transmission-side tunable filter is capable of selectively passing the transmission signal within one frequency band, for example, even when the transmission circuit outputs the transmission signals within multiple frequency bands. Accordingly, the signals within extra frequency bands, which are not transmitted, are prevented from being mixed into the first and second cancel signals.

In addition, since the reception-side tunable filter is provided between the combining unit and the reception circuit, the reception-side tunable filter is capable of selectively passing the reception signal within one frequency band corresponding to, for example, the transmission signal within the frequency band selected by the transmission-side tunable filter. Accordingly, it is possible to remove the signals within the frequency bands other than the frequency band selected by the reception-side tunable filter to improve a signal-to-noise (S/N) ratio of the reception signal.

(6) In the present invention, the transmission-reception apparatus further includes a delay circuit that is provided on at least one of a connection line via which the dividing unit is connected to the combining unit through the first cancel signal output portion and a connection line via which the dividing unit is connected to the combining unit through the antenna sharing device.

According to the present invention, when the delay circuit is provided in the first cancel signal output portion, for example, the length of the line from the antenna sharing device to the antenna is long. Accordingly, even if a sufficient delay occurs in the reflected signal only with phase adjustment, the signal is delayed with the delay circuit to allow the first cancel signal that has a phase opposite to that of the reflected signal and that has the same amplitude as that of the reflected signal to be combined with the reception signal including the noise signals. When the delay circuit is provided on the connection line via which the dividing unit is connected to the combining unit through the antenna sharing device, even if delays occur in the first and second cancel signals in accordance with the adjustment of the amplitude and the phase, the signal is delayed with the delay circuit to allow the first and second cancel signals that have phases opposite to those of the reflected signal and the leakage signal, respectively, and that have the same amplitudes as those of the reflected signal and the leakage signal, respectively, to be combined with the reception signal including the noise signals.

(7) In the present invention, the transmission-reception apparatus further includes a filter circuit that is provided on a connection line via which the antenna sharing device is connected to the dividing unit.

According to the present invention, since the filter circuit is provided on the connection line via which the antenna sharing device is connected to the dividing unit, the signal within the frequency band to be cancelled can be attenuated with the filter circuit. Since the signal within the frequency band to be cancelled is attenuated, the load is reduced in a portion where the amplitude of the cancel signal is adjusted.

(8) In the present invention, the antenna sharing device is composed of a circulator.

According to the present invention, since the antenna sharing device is composed of the circulator, it is possible to increase the frequency bands of the transmission signal and the reception signal, compared with a case in which the antenna sharing device is composed of, for example, a duplexer.

BRIEF DESCRIPTION OF THE SEVERAL VIEWS OF THE DRAWINGS

FIG. 15 is a descriptive diagram illustrating a first amplitude-phase adjustment map stored in a memory in a control circuit in FIG. 14.

FIG. 16 is a descriptive diagram illustrating a second amplitude-phase adjustment map stored in the memory in the control circuit in FIG. 14.

DETAILED DESCRIPTION OF THE INVENTION

Transmission-reception apparatuses according to the embodiments of the present invention will herein be described with reference to the attached drawings. The transmission-reception apparatuses are exemplarily applied to communication apparatuses.

Figure 2:
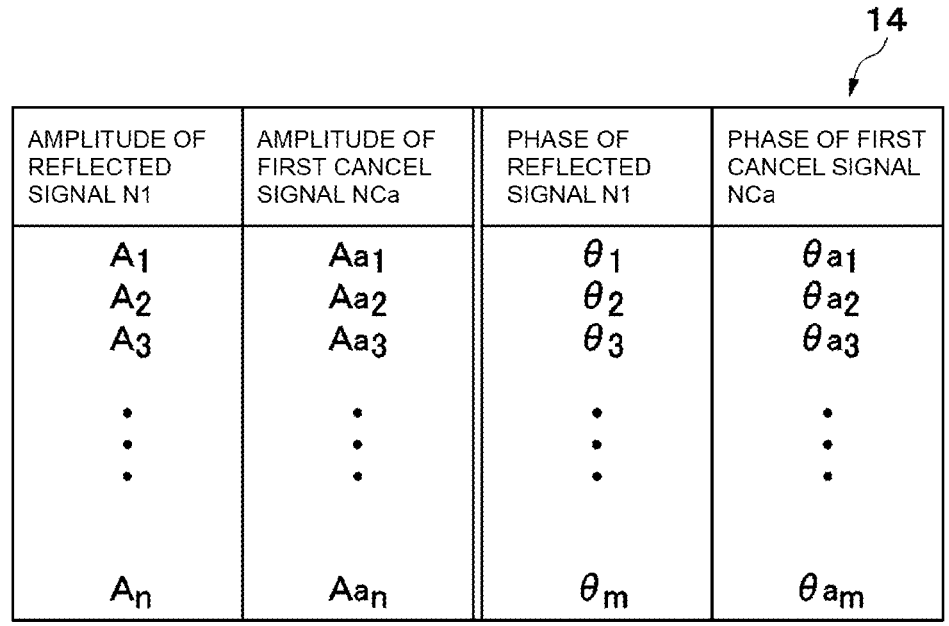
FIG. 2 is a descriptive diagram illustrating a first amplitude-phase adjustment map stored in a memory in a control circuit in FIG. 1.
Figure 3:
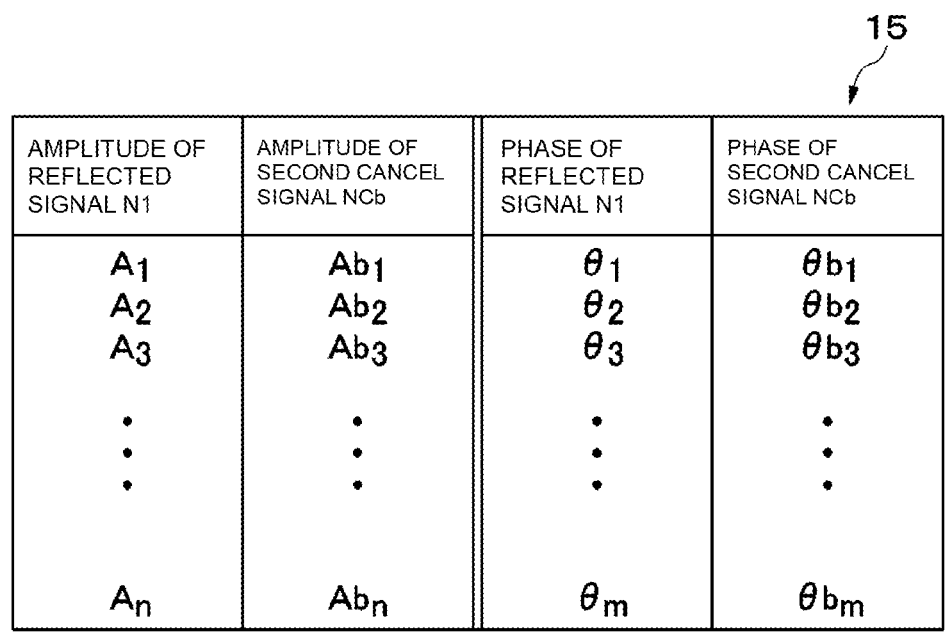
FIG. 3 is a descriptive diagram illustrating a second amplitude-phase adjustment map stored in the memory in the control circuit in FIG. 1.

A first embodiment of the present invention will now be described with reference to FIG. 1 to FIG. 3. A communication apparatus 1 includes a transmission circuit 2, a reception circuit 3, an antenna 4, and a noise cancelling unit 5.

The transmission circuit 2 outputs a transmission signal TX within a frequency band Ft1, for example, from several hundred megahertz (MHz) to several gigahertz (GHz). The transmission signal TX is externally transmitted from the antenna 4. The reception circuit 3 demodulates a reception signal RX within a frequency band Fr1, for example, from several hundred MHz to several GHz. The reception signal RX is received by the antenna 4. The frequency band Fr1 of the reception signal RX is different from the frequency band Ft1 of the transmission signal TX.

The noise cancelling unit 5 is provided between the antenna 4, and the transmission circuit 2 and the reception circuit 3. The noise cancelling unit 5 includes, for example, an antenna sharing device 6, a dividing portion 7, a cancel signal output circuit 8, a combining portion 11, a reflected signal detector 12, and a control circuit 13 described below.

The antenna sharing device 6 is connected between the antenna 4, and the transmission circuit 2 and the reception circuit 3. The antenna sharing device 6 isolates the transmission signal TX from the reception signal RX so that the transmission signal TX is not mixed with the reception signal RX. A circulator, a duplexer, etc. is used as the antenna sharing device 6. The antenna sharing device 6 is exemplified by a circulator CL in the following description. The circulator CL has a three-terminal structure and includes terminals 6A, 6B, and 6C. The terminal 6A of the circulator CL is connected to the transmission circuit 2 and the transmission signal TX is input into the antenna sharing device 6 through the terminal 6A. The terminal 6B of the circulator CL is connected to the reception circuit 3 and the reception signal RX received by the antenna 4 is output through the terminal 6B. The terminal 6C of the circulator CL is connected to the antenna 4. The transmission signal TX is output from the antenna sharing device 6 through the terminal 6C and the reception signal RX is input into the antenna sharing device 6 through the terminal 6C.

The circulator CL supplies the transmission signal TX input through the terminal 6A to the antenna 4 through the terminal 6C and supplies the reception signal RX supplied from the antenna 4 through the terminal 6C to the reception circuit 3 through the terminal 6B.

In response to variation in impedance of the antenna 4, a part of the transmission signal TX output through the terminal 6C of the circulator CL is reflected from the antenna 4. A reflected signal N1 is input into the antenna sharing device 6 through the terminal 6C and is output from the antenna sharing device 6 through the terminal 6B. Although the circulator CL prevents the interference between the transmission signal TX and the reception signal RX, it is not possible for the circulator CL to completely prevent the interference between the transmission signal TX and the reception signal RX. Accordingly, the transmission signal TX input through the terminal 6A is leaked and a leakage signal N2 is output through the terminal 6B through which the reception signal RX is output. Consequently, in addition to the reception signal RX received by the antenna 4, a reception signal RXn including noise signals: the reflected signal N1 and the leakage signal N2 of the transmission signal TX is output through the terminal 6B of the circulator CL.

The dividing portion 7 is connected between the circulator CL and the transmission circuit 2 and composes a dividing unit. The dividing portion 7 includes a first divider 7A and a second divider 7B. The dividing portion 7 supplies the transmission signal TX output from the transmission circuit 2 to the circulator CL and extracts signals from the transmission signal TX. Specifically, the first divider 7A in the dividing portion 7 divides a part of the transmission signal TX as a first divided signal Sa and supplies the first divided signal Sa to a first cancel signal output portion 9. The second divider 7B divides a part of the transmission signal TX as a second divided signal Sb and supplies the second divided signal Sb to a second cancel signal output portion 10.

Figure 1:
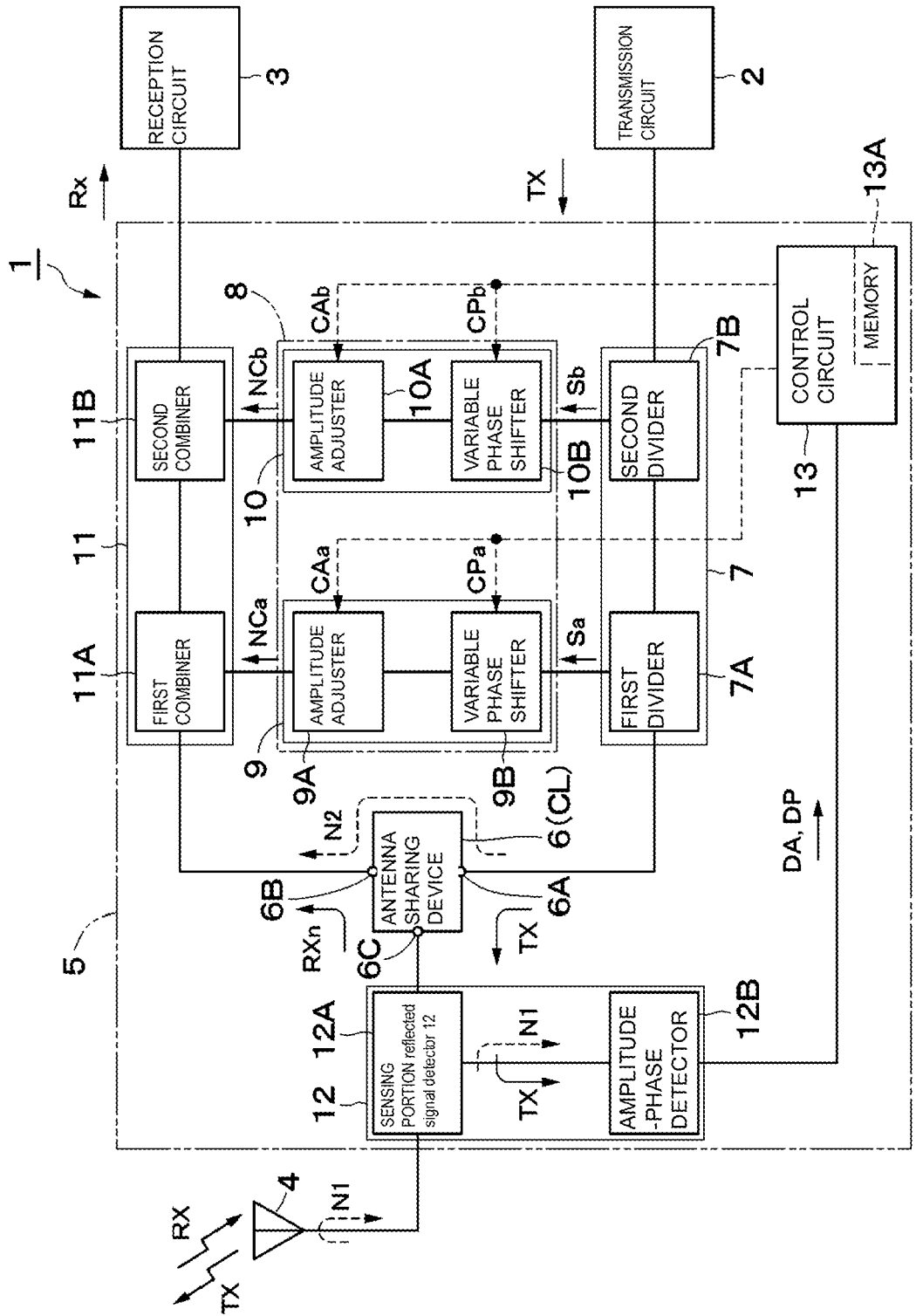
FIG. 1 is a block diagram illustrating a communication apparatus according to a first embodiment.

Although the configuration in which the first divider 7A is disposed closer to the circulator CL than the second divider 7B is illustrated in FIG. 1, the second divider 7B may be disposed closer to the circulator CL than the first divider 7A.

The cancel signal output circuit 8 includes the first cancel signal output portion 9 and the second cancel signal output portion 10. The first cancel signal output portion 9 outputs a first cancel signal NCa on the basis of the first and second divided signals Sa and Sb extracted by the dividing portion 7. The second cancel signal output portion 10 outputs a second cancel signal NCb on the basis of the first and second divided signals Sa and Sb extracted by the dividing portion 7. The first cancel signal NCa is used to cancel (offset) the reflected signal N1 of the transmission signal TX from the antenna 4. The second cancel signal NCb is used to cancel (offset) the leakage signal N2 of the transmission signal TX from the circulator CL.

The first cancel signal output portion 9 controls the amplitude and the phase of the first divided signal Sa divided from the transmission signal TX and supplies the result of the control to the combining portion 11 as the first cancel signal NCa. The first cancel signal output portion 9 includes an amplitude adjuster 9A that adjusts the amplitude of the first divided signal Sa and a variable phase shifter 9B that adjusts the phase of the first divided signal Sa. In the first cancel signal output portion 9, the amplitude and the phase of the first divided signal Sa are controlled (adjusted) on the basis of first control signals CAa and CPa supplied from the control circuit 13 described below so that the first cancel signal NCa has a phase opposite to that of the reflected signal N1 of the transmission signal TX reflected from the antenna 4 and has the amplitude equal to that of the reflected signal N1. The first cancel signal output portion 9 supplies the first cancel signal NCa to a first combiner 11A.

The second cancel signal output portion 10 controls the amplitude and the phase of the second divided signal Sb divided from the transmission signal TX and supplies the result of the control to the combining portion 11 as the second cancel signal NCb. The second cancel signal output portion 10 includes an amplitude adjuster 10A that adjusts the amplitude of the second divided signal Sb and a variable phase shifter 10B that adjusts the phase of the second divided signal Sb. In the second cancel signal output portion 10, the amplitude and the phase of the second divided signal Sb are controlled (adjusted) on the basis of second control signals CAb and CPb supplied from the control circuit 13 described below so that the second cancel signal NCb has a phase opposite to that of the leakage signal N2 of the transmission signal TX from the circulator CL and has the amplitude equal to that of the leakage signal N2. The second cancel signal output portion 10 supplies the second cancel signal NCb to a second combiner 11B.

The combining portion 11 is connected between the circulator CL and the reception circuit 3 and composes a combining unit. The combining portion 11 combines the first cancel signal NCa output from the first cancel signal output portion 9 and the second cancel signal NCb output from the second cancel signal output portion 10 with the reception signal RXn including the noise signals, output from the circulator CL. As a result, the combining portion 11 supplies a reception signal Rx resulting from the removal of the noise signals including the reflected signal N1 and the leakage signal N2 of the transmission signal TX from the reception signal RXn to the reception circuit 3.

The combining portion 11 includes the first combiner 11A and the second combiner 11B. The first combiner 11A combines the reception signal RXn including the noise signals with the first cancel signal NCa. The second combiner 11B combines the reception signal RXn including the noise signals with the second cancel signal NCb.

In the combining portion 11, the reflected signal N1 reflected from the antenna 4 is offset by the first cancel signal NCa and the leakage signal N2 of the transmission signal TX from the circulator CL is offset by the second cancel signal NCb to generate the reception signal Rx substantially equal to the reception signal RX received by the antenna 4.

Although the configuration in which the first combiner 11A is disposed closer to the circulator CL than the second combiner 11B is illustrated in FIG. 1, the second divider 7B may be disposed closer to the circulator CL than the first divider 7A.

The reflected signal detector 12 is provided between the circulator CL and the antenna 4 and detects the reflected signal N1 of the transmission signal TX, which is output from the transmission circuit 2, from the antenna 4. The reflected signal detector 12 includes a sensing portion 12A and an amplitude-phase detector 12B and composes a reflected signal detecting unit.

The sensing portion 12A detects the reflected signal N1 of the transmission signal TX, which is reflected from the antenna 4. The sensing portion 12A is composed of, for example, a directional coupler. The sensing portion 12A isolates the transmission signal TX from the reflected signal N1 and outputs the transmission signal TX separately from the reflected signal N1.

The amplitude-phase detector 12B detects the amplitude and the phase of the reflected signal N1. Specifically, the amplitude-phase detector 12B detects the amplitude of the reflected signal N1 output from the sensing portion 12A and compares the transmission signal TX with the reflected signal N1, which are output from the sensing portion 12A, to detect the phase difference between the transmission signal TX and the reflected signal N1. The amplitude-phase detector 12B supplies a detection signal DA (an amplitude detection signal) corresponding to the amplitude of the reflected signal N1 and a detection signal DP (a phase detection signal) corresponding to the phase of the reflected signal N1 to the control circuit 13 described below.

The control circuit 13 controls both the first cancel signal output portion 9 and the second cancel signal output portion 10. The control circuit 13 adjusts the amplitudes and the phases of the first cancel signal NCa and the second cancel signal NCb on the basis of the amplitude and the phase of the reflected signal N1 detected by the reflected signal detector 12.

Specifically, the control circuit 13 supplies the first control signals CAa and CPa used to control the amplitude and the phase of the first divided signal Sa to the first cancel signal output portion 9 on the basis of the detection signals DA and DP supplied from the reflected signal detector 12 and supplies the second control signals CAb and CPb used to control the amplitude and the phase of the second divided signal Sb to the second cancel signal output portion 10 on the basis of the detection signals DA and DP supplied from the reflected signal detector 12.

The control circuit 13 includes a memory 13A. As illustrated in FIG. 2, the memory 13A stores a first amplitude-phase adjustment map 14. The relationship between the amplitude and the phase of the reflected signal N1 and the amplitude and the phase of the first cancel signal NCa by which the reflected signal N1 is offset is recorded in the first amplitude-phase adjustment map 14. As illustrated in FIG. 3, the memory 13A stores a second amplitude-phase adjustment map 15. The relationship between the amplitude and the phase of the reflected signal N1 and the amplitude and the phase of the second cancel signal NCb by which the leakage signal N2 corresponding to the reflected signal N1 is offset is recorded in the second amplitude-phase adjustment map 15.

In the first amplitude-phase adjustment map 14, for example, the amplitude of the reflected signal N1 is divided into a n-number ranges (amplitudes $A_1$ to $A_n$) and the phase of the reflected signal N1 is divided into a m-number ranges (phases $\theta_1$ to $\theta_n$). The n-number may be equal to the m-number or may be different from the m-number. Amplitudes $Aa_1$ to $Aa_n$ of the first cancel signal NCa corresponding to the amplitudes $A_1$ to $A_n$ of the reflected signal N1 and phases $\theta a_1$ to $\theta a_m$ of the first cancel signal NCa corresponding to the phases $\theta_1$ to $\theta_m$ of the reflected signal N1 are recorded in the first amplitude-phase adjustment map 14.

Amplitudes $Ab_1$ to $Ab_n$ of the second cancel signal NCb corresponding to the amplitudes $A_1$ to $A_n$ of the reflected signal N1 and phases $\theta b_1$ to $\theta b_m$ of the second cancel signal NCb corresponding to the phases $\theta_1$ to $\theta_m$ of the reflected signal N1 are recorded in the second amplitude-phase adjustment map 15, substantially as in the first amplitude-phase adjustment map 14. The first and second amplitude-phase adjustment maps 14 and 15 are acquired experimentally in consideration of the characteristics of the antenna 4 and the circulator CL.

Upon reception of the detection signals DA and DP from the amplitude-phase detector 12B, the control circuit 13 identifies the amplitude and the phase of the reflected signal N1 on the basis of the detection signals DA and DP. Then, the control circuit 13 applies the amplitude and the phase of the reflected signal N1 to the first amplitude-phase adjustment map 14 to identify the amplitude and the phase of the first cancel signal NCa and outputs the control signal CAa (a first amplitude control signal) corresponding to the identified amplitude and the control signal CPa (a first phase control signal) corresponding to the identified phase. The control circuit 13 applies the amplitude and the phase of the reflected signal N1 to the second amplitude-phase adjustment map 15 to identify the amplitude and the phase of the second cancel signal NCb and outputs the control signal CAb (a second amplitude control signal) corresponding to the identified amplitude and the control signal CPb (a second phase control signal) corresponding to the identified phase.

Here, the phase of the first cancel signal NCa identified using the first amplitude-phase adjustment map 14 is opposite to that of the reflected signal N1 and the amplitude of the first cancel signal NCa identified using the first amplitude-phase adjustment map 14 is the same as that of the reflected signal N1. The phase of the second cancel signal NCb identified using the second amplitude-phase adjustment map 15 is opposite to that of the leakage signal N2 and the amplitude of the second cancel signal NCb identified using the second amplitude-phase adjustment map 15 is the same as that of the leakage signal N2.

Accordingly, the control circuit 13 adjusts the first control signals CAa and CPa on the basis of the detection signals DA and DP so that the first cancel signal NCa has a phase opposite to that of the reflected signal N1 and has the same amplitude as that of the reflected signal N1. The control circuit 13 adjusts the second control signals CAb and CPb on the basis of the detection signals DA and DP so that the second cancel signal NCb has a phase opposite to that of the leakage signal N2 of the transmission signal TX from the circulator CL and has the same amplitude as that of the leakage signal N2.

The operation of the communication apparatus 1 according to the present embodiment, which has the above configuration, will now be described.

The transmission signal TX output from the transmission circuit 2 is input into the antenna 4 via the circulator CL and is externally transmitted from the antenna 4. The reception signal RX received by the antenna 4 is input into the reception circuit 3 via the circulator CL and is demodulated by the reception circuit 3.

In the communication apparatus 1, such as a cellular phone or a mobile terminal, the impedance of the antenna 4 is varied depending on, for example, how the user holds the communication apparatus 1. Since mismatching occurs between the antenna 4 and a transmission line (connection wiring) in association with the variation in impedance of the antenna 4, a part of the transmission signal TX is reflected to generate the reflected signal N1 and the amplitude and the phase of the reflected signal N1 are varied with the impedance of the antenna 4.

Here, in the noise cancelling unit 5, the amplitude-phase detector 12B outputs the detection signals DA and DP corresponding to the amplitude and the phase of the reflected signal N1 and the control circuit 13 adjusts the first control signals CAa and CPa on the basis of the detection signals DA and DP. The first cancel signal output portion 9 controls the amplitude and the phase of the first divided signal Sa resulting from the division of the transmission signal TX in the dividing portion 7 and outputs the first cancel signal NCa that has a phase opposite to that of the reflected signal N1 and that has the same amplitude as that of the reflected signal N1. As a result, the phase and the amplitude of the first cancel signal NCa can be adjusted so that the first cancel signal NCa has a phase opposite to that of the reflected signal N1 and has the same amplitude as that of the reflected signal N1 even when the amplitude and the phase of the reflected signal N1 are varied, thereby removing the reflected signal N1.

Since the circulator CL is affected by the variation in impedance of the antenna 4, the amplitude and the phase of the leakage signal N2 of the transmission signal TX passing through the circulator CL also tend to be varied with the impedance of the antenna 4. Here, the amplitude and the phase of the reflected signal N1 are varied and the amplitude and the phase of the leakage signal N2 are also varied with the variation in impedance of the antenna 4, so that certain relationship is established between the variation of the reflected signal N1 and the variation of the leakage signal N2.

Accordingly, the control circuit 13 in the noise cancelling unit 5 adjusts the second control signals CAb and CPb on the basis of the detection signals DA and DP of the reflected signal N1. The second cancel signal output portion 10 controls the amplitude and the phase of the second divided signal Sb resulting from the division of the transmission signal TX in the dividing portion 7 and outputs the second cancel signal NCb that has a phase opposite to that of the leakage signal N2 and that has the same amplitude as that of the leakage signal N2. As a result, the phase and the amplitude of the second cancel signal NCb can be adjusted so that the second cancel signal NCb has a phase opposite to that of the leakage signal N2 and has the same amplitude as that of the leakage signal N2 even when the amplitude and the phase of the leakage signal N2 are varied with the variation in impedance of the antenna 4, thereby removing the leakage signal N2.

Since the antenna sharing device 6 is composed of the circulator CL, the frequency bands of the transmission signal TX and the reception signal RX can be increased, compared with a case in which the antenna sharing device 6 is composed of, for example, a duplexer.

Figure 4:
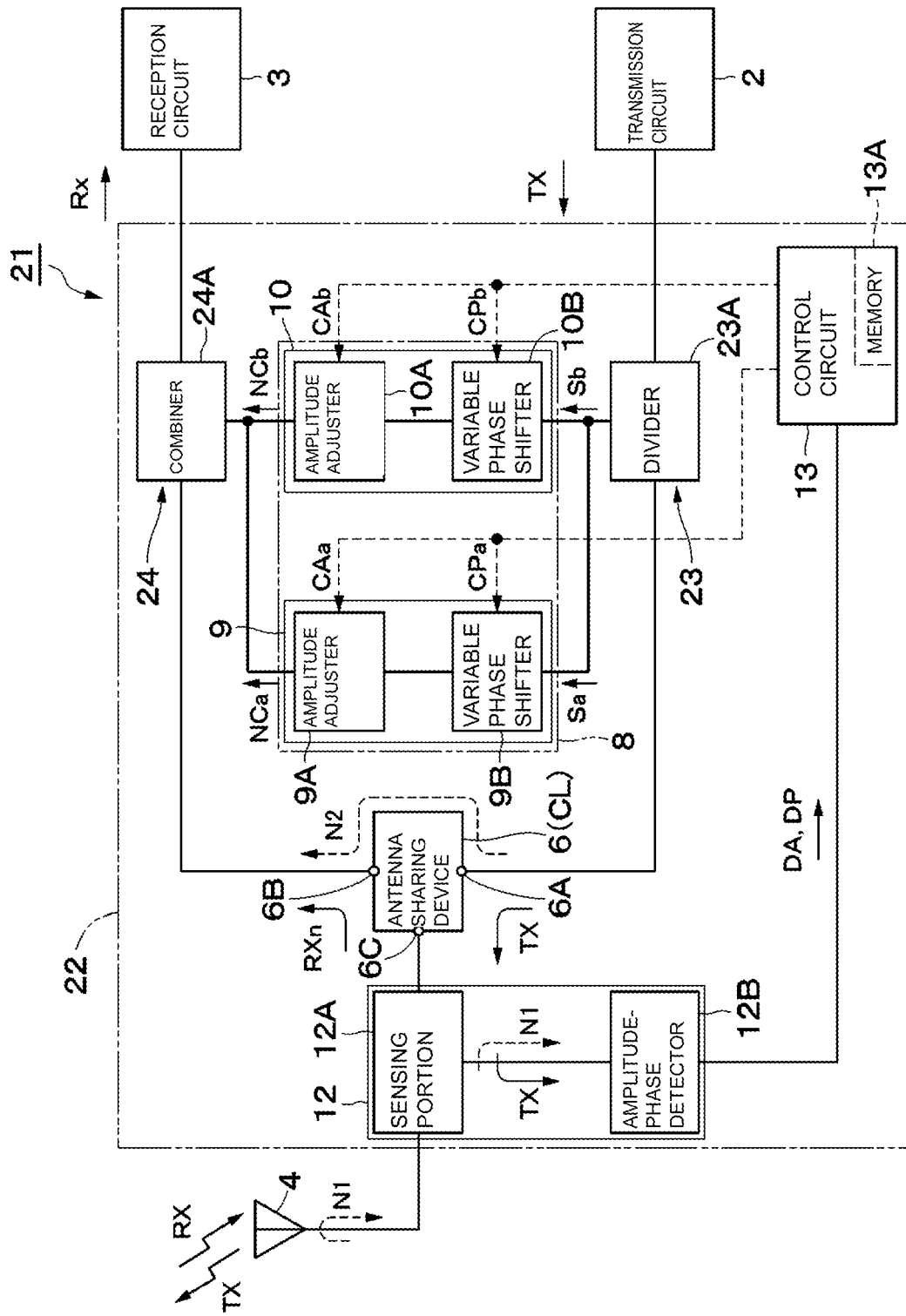
FIG. 4 is a block diagram illustrating a communication apparatus according to a second embodiment.

Next, a second embodiment of the present invention is illustrated in FIG. 4. The second embodiment is characterized in that the dividing portion is composed of a single divider. The same reference numerals are used in the second embodiment to identify the same components in the first embodiment. A description of such components is omitted herein.

A communication apparatus 21 includes the transmission circuit 2, the reception circuit 3, the antenna 4, and a noise cancelling unit 22, substantially as in the communication apparatus 1 according to the first embodiment.

The noise cancelling unit 22 includes, for example, the antenna sharing device 6, a dividing portion 23, the cancel signal output circuit 8, a combining portion 24, the reflected signal detector 12, and the control circuit 13.

The dividing portion 23 is connected between the circulator CL, which is the antenna sharing device 6, and the transmission circuit 2 and composes the dividing unit. The dividing portion 23 is composed of a single divider 23A. The divider 23A supplies the transmission signal TX output from the transmission circuit 2 to the circulator CL. In addition, the divider 23A divides a part of the transmission signal TX as the first divided signal Sa and supplies the first divided signal Sa to the first cancel signal output portion 9. The divider 23A divides a part of the transmission signal TX as the second divided signal Sb and supplies the second divided signal Sb to the second cancel signal output portion 10. Here, the first divided signal Sa is equal to the second divided signal Sb.

The combining portion 24 is connected between the circulator CL and the reception circuit 3 and composes the combining unit. The combining portion 24 is composed of a single combiner 24A. The combiner 24A combines the first cancel signal NCa and the second cancel signal NCb with the reception signal RXn including the noise signals. As a result, the combiner 24A offsets the reflected signal N1 of the transmission signal TX by the first cancel signal NCa and offsets the leakage signal N2 of the transmission signal TX by the second cancel signal NCb. The combining portion 24 supplies the reception signal Rx resulting from the removal of the noise signals including the reflected signal N1 and the leakage signal N2 of the transmission signal TX from the reception signal RXn to the reception circuit 3.

As a result, effects and advantages similar to those in the first embodiment can be achieved also in the second embodiment. In particular, since the dividing portion 23 is composed of the single divider 23A in the second embodiment, it is not necessary to provide multiple dividers. Accordingly, the manufacturing cost can be reduced with the simplified configuration. Similarly, since the combining portion 24 is composed of the single combiner 24A, it is not necessary to provide multiple combiners. Accordingly, the manufacturing cost can be further reduced.

The configuration is adopted in the second embodiment, in which a branch point of a signal from the divider 23A to the first cancel signal output portion 9 and the second cancel signal output portion 10 is provided and the first and second divided signals Sa and Sb are divided at the branch point. In addition, the configuration is adopted in the second embodiment, in which a branch point of a signal from the first cancel signal output portion 9 and the second cancel signal output portion 10 to the combiner 24A is provided and the first and second cancel signals NCa and NCb are combined at the branch point.

Figure 5:
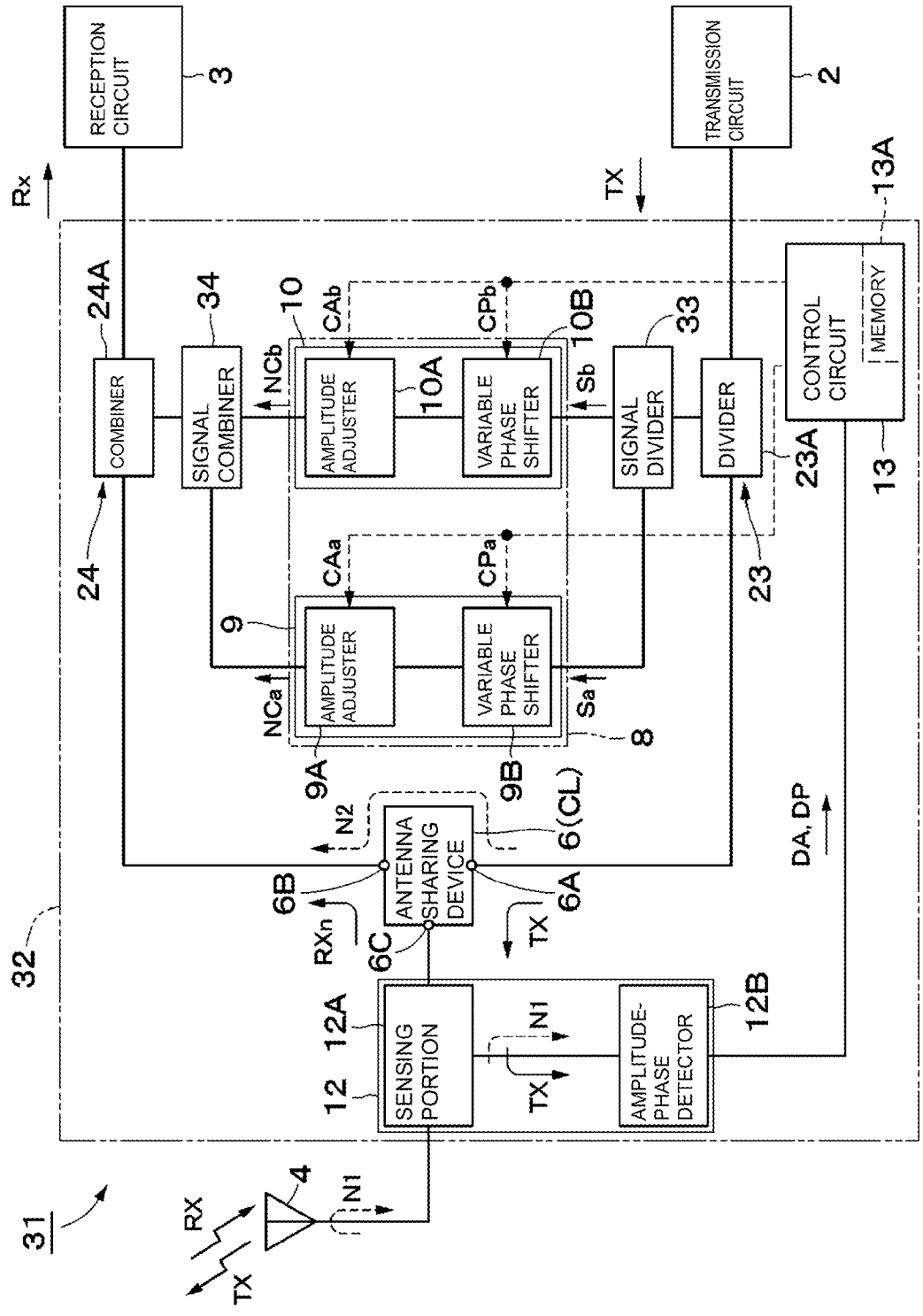
FIG. 5 is a block diagram illustrating a communication apparatus according to a first modification.

However, the present invention is not limited to the above configuration. For example, as in a communication apparatus 31 according to a first modification illustrated in FIG. 5, a configuration may be adopted in which a noise cancelling unit 32 includes a signal divider 33 between the divider 23A, and the first cancel signal output portion 9 and the second cancel signal output portion 10 and the division into the first and second divided signals Sa and Sb is performed by the signal divider 33.

In the above configuration, a signal combiner 34 may be provided between the first cancel signal output portion 9 and the second cancel signal output portion 10, and the combiner 24A and the combination of the first and second cancel signals NCa and NCb may be performed by the signal combiner 34.

The signal divider 33 is composed of, for example, a resistance divider or a coupler. When the resistance divider is used, an available signal band is increased while the strength of the divided signals is likely to decrease. In contrast, when the coupler is used, the strength of the divided signals is difficult to decrease while the available signal band is decreased. The signal combiner is appropriately configured in consideration of these merits and demerits. Similarly, the signal combiner 34 is composed of, for example, a resistance combiner or a coupler.

Here, the signal divider 33 and the signal combiner 34 has a function to isolate the first cancel signal output portion 9 from the second cancel signal output portion 10, in addition to the functions to divide and combine the signals, respectively. Accordingly, the noise characteristics are improved, compared with the communication apparatus 21 illustrated in FIG. 4 in which the signals are simply divided and combined.

Figure 6:
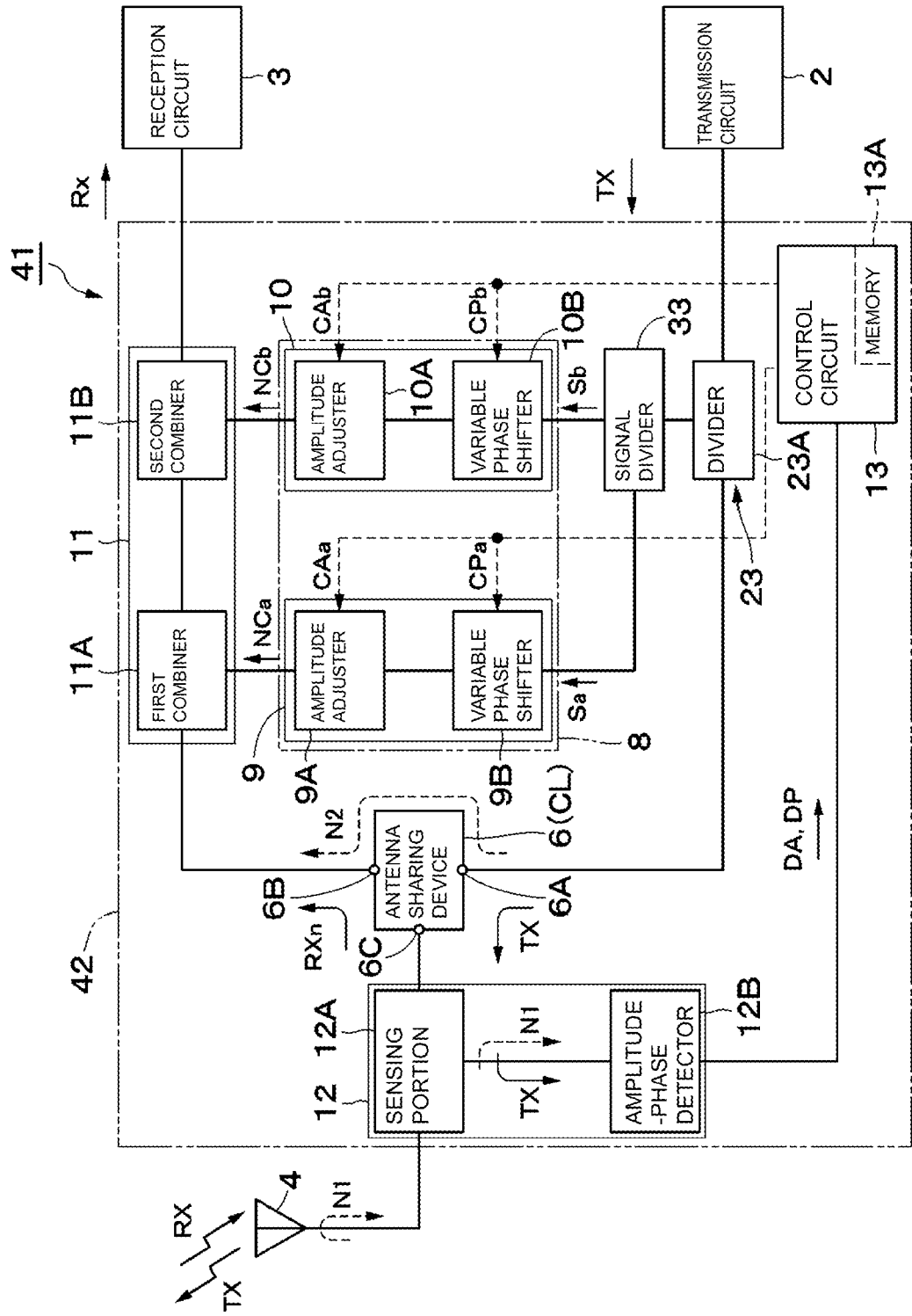
FIG. 6 is a block diagram illustrating a communication apparatus according to a second modification.

Alternatively, as in a communication apparatus 41 according to a second modification illustrated in FIG. 6, a noise cancelling unit 42 may be configured such that the dividing portion 23 is composed of the single divider 23A and the combining portion 11 is composed of the first combiner 11A and the second combiner 11B. In this case, even if the amplitudes and the phases of the first and second divided signals Sa and Sb are varied in the divider 23A, the variation is absorbed in the first and second cancel signal output portions 9 and 10. In addition, since the combining portion 11 is composed of the first combiner 11A and the second combiner 11B in the second modification, a problem in the combination of the reception signal RXn with the first and second cancel signals NCa and NCb hardly occurs, compared with the case in which the combining portion is composed of the single combiner.

In the second modification, the signal divider 33 may be provided between the divider 23A, and the first cancel signal output portion 9 and the second cancel signal output portion 10 or the signal divider 33 may be omitted, as in the second embodiment illustrated in FIG. 4.

Figure 7:
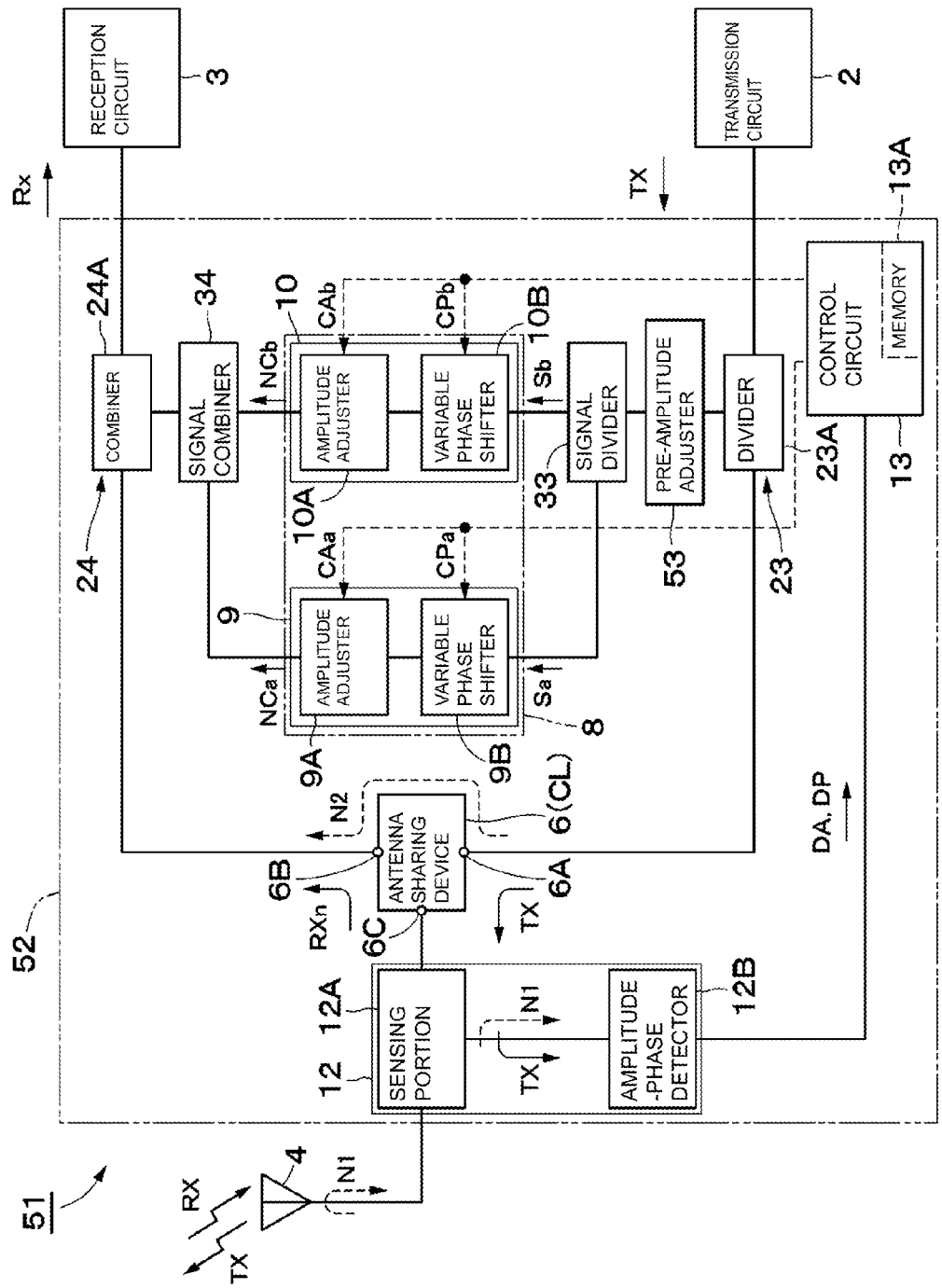
FIG. 7 is a block diagram illustrating a communication apparatus according to a third modification.

Alternatively, as in a communication apparatus 51 according to a third modification illustrated in FIG. 7, a noise cancelling unit 52 may be configured such that a pre-amplitude adjuster 53 is connected between the divider 23A and the signal divider 33, in addition to the components of the first modification. In this case, the amplitudes of the first and second divided signals Sa and Sb may be adjusted together by the pre-amplitude adjuster 53 in advance before the first and second divided signals Sa and Sb are supplied to the first and cancel signal output portions 9 and 10, respectively. With this configuration, the load on the amplitude adjuster 9A in the first cancel signal output portion 9 and the load on the amplitude adjuster 10A in the second cancel signal output portion 10 are reduced.

Although the case in which the third modification is applied to the first modification is exemplified above, the third modification may be applied to the second embodiment illustrated in FIG. 4 or to the second modification illustrated in FIG. 6.

Figure 8:
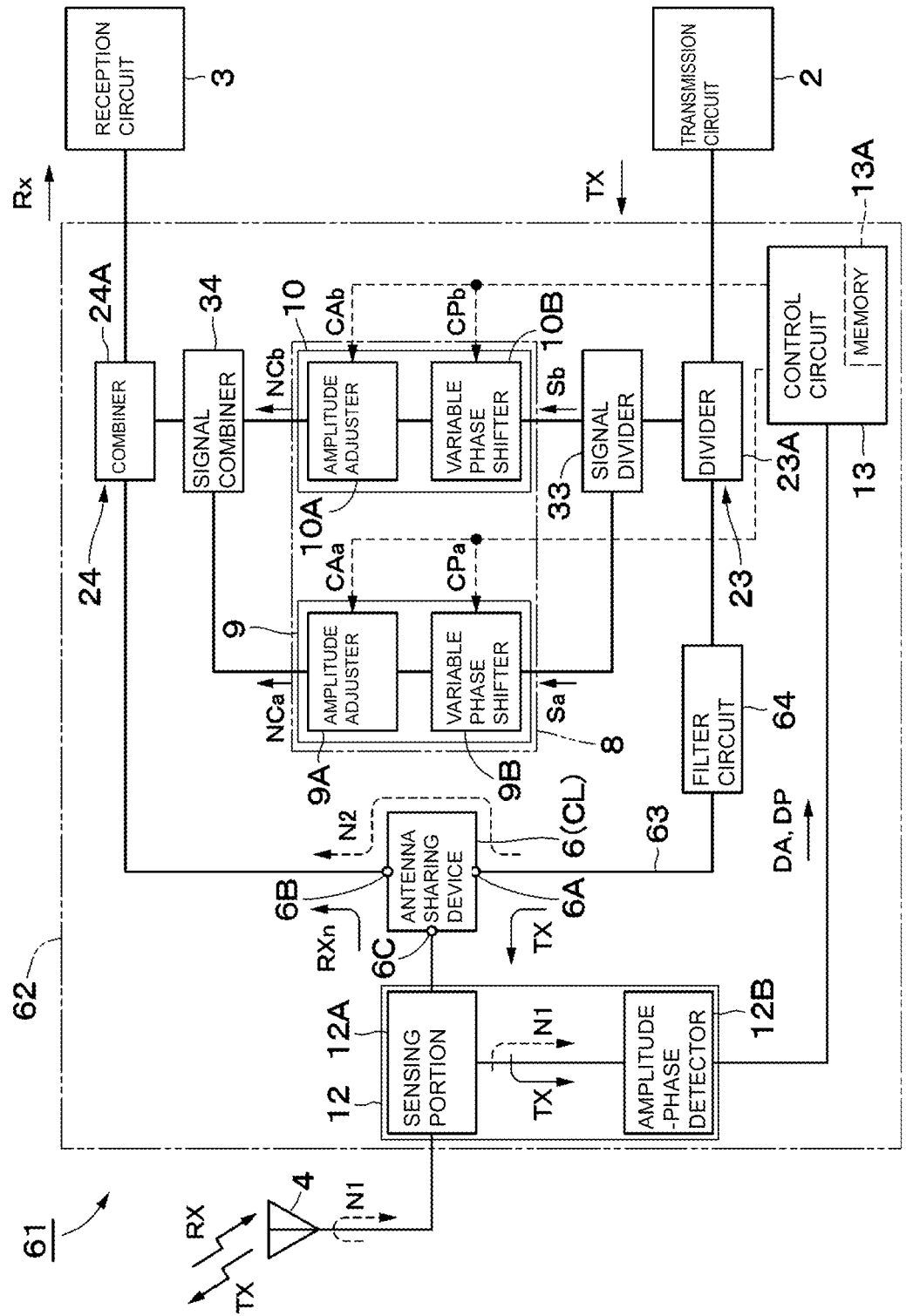
FIG. 8 is a block diagram illustrating a communication apparatus according to a fourth modification.

The pre-amplitude adjuster 53 amplifying the divided signal is provided in the configuration in FIG. 7. However, as in a communication apparatus 61 according to a fourth modification illustrated in FIG. 8, a noise cancelling unit 62 may include a filter circuit 64 that attenuates a signal within a frequency band to be cancelled on a connection line 63 that connects the antenna sharing device 6 to the dividing portion 23, instead of the pre-amplitude adjuster 53. Since the signal within the frequency band to be cancelled are attenuated, this results in reduction of the loads on the amplitude adjuster 9A and 10A. The filter circuit 64 may be a tunable filter.

The fourth modification may be applied to the first or second embodiment, may be applied to the first or second modification, or may be applied to any of third to fifth embodiments described below or to any of fifth to seventh modifications described below.

Figure 9:
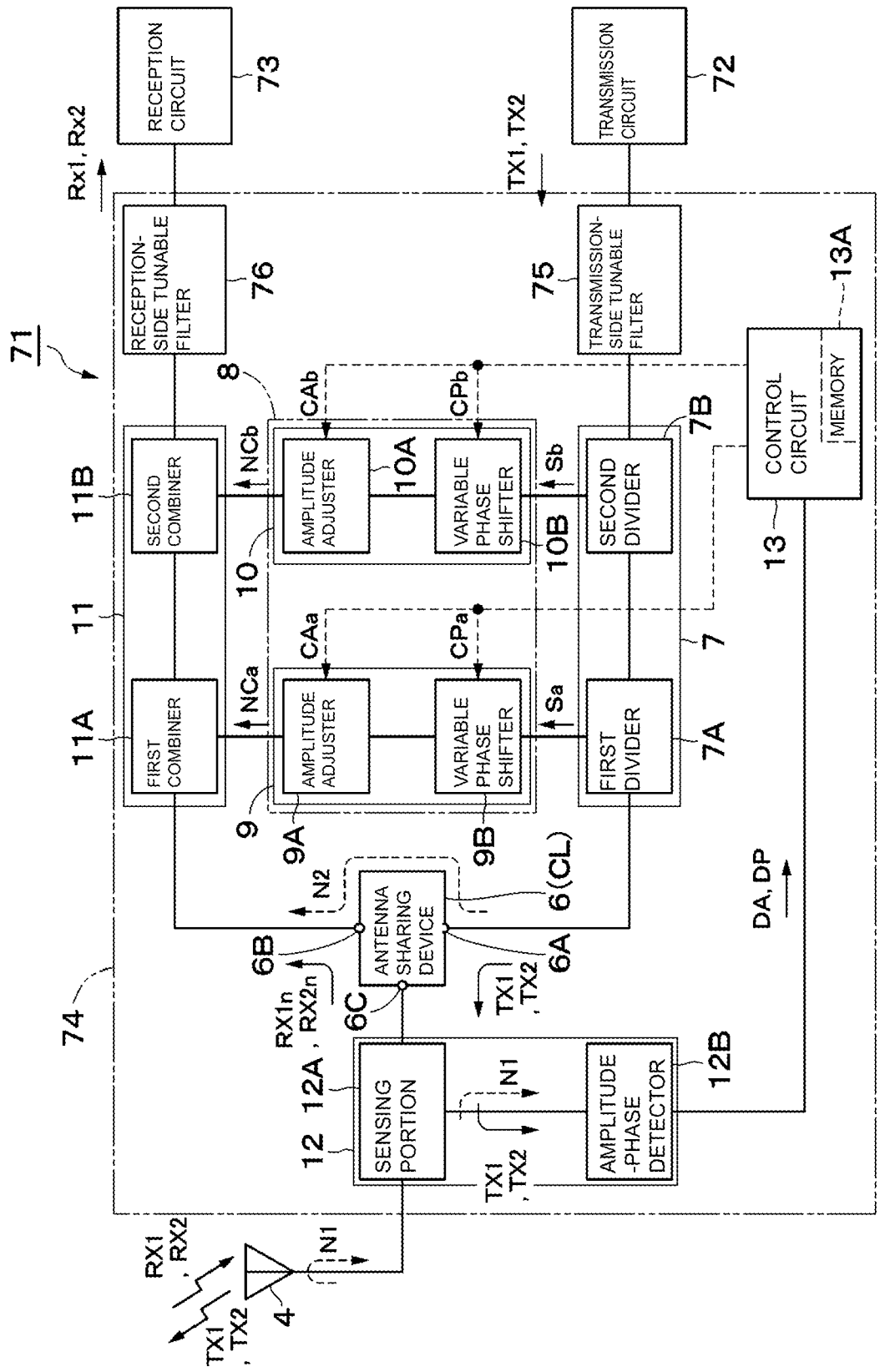
FIG. 9 is a block diagram illustrating a communication apparatus according to a third embodiment.

Next, a third embodiment of the present invention is illustrated in FIG. 9. The third embodiment is characterized in that the third embodiment is applied to a multiband communication apparatus and in that the communication apparatus further includes a transmission-side tunable filter and a reception-side tunable filter. The transmission-side tunable filter selectively passes a transmission signal within one frequency band, among transmission signals within multiple frequency bands. The reception-side tunable filter selectively passes a reception signal within one frequency band, among reception signals within multiple frequency bands. The same reference numerals are used in the third embodiment to identify the same components in the first embodiment. A description of such components is omitted herein.

A communication apparatus 71 includes a transmission circuit 72, a reception circuit 73, the antenna 4, and a noise cancelling unit 74, substantially as in the communication apparatus 1 according to the first embodiment.

The transmission circuit 72 outputs transmission signals TX1 and TX2 within two frequency bands Ft1 and Ft2, respectively, for example, from several hundred MHz to several GHz. The transmission signals TX1 and TX2 are externally transmitted from the antenna 4. The frequency band Ft1 of the transmission signal TX1 is different from the frequency band Ft2 of the transmission signal TX2.

The reception circuit 73 demodulates reception signals RX1 and RX2 within two frequency bands Fr1 and Fr2, respectively, for example, from several hundred MHz to several GHz. The reception signals RX1 and RX2 are received by the antenna 4. The frequency band Fr1 of the reception signal RX1 is different from the frequency band Fr2 of the reception signal RX2. The transmission signal TX1 corresponds to the reception signal RX1 and the transmission signal TX2 corresponds to the reception signal RX2. Accordingly, the frequency band Fr1 of the reception signal RX1 is different from the frequency band Ft1 of the transmission signal TX1, and the frequency band Fr2 of the reception signal RX2 is different from the frequency band Ft2 of the transmission signal TX2.

The frequency band Fr1 of the reception signal RX1 may be overlapped with the frequency band Ft2 of the transmission signal TX2 or may be different from the frequency band Ft2 of the transmission signal TX2. Similarly, the frequency band Fr2 of the reception signal RX2 may be overlapped with the frequency band Ft1 of the transmission signal TX1 or may be different from the frequency band Ft1 of the transmission signal TX1.

The noise cancelling unit 74 includes the antenna sharing device 6, the dividing portion 7, the first and second cancel signal output circuits 8, the combining portion 11, the reflected signal detector 12, and the control circuit 13. The noise cancelling unit 74 further includes a transmission-side tunable filter 75 and a reception-side tunable filter 76.

The transmission-side tunable filter 75 selects one of the transmission signals TX1 and TX2 within the two frequency bands Ft1 and Ft2, respectively, which are output from the transmission circuit 72, and passes the selected transmission signal TX1 or TX2. The reception-side tunable filter 76 selects one of the reception signals RX1 and RX2 within the two frequency bands Fr1 and Fr2, respectively, which are to be received into the reception circuit 73, and passes the selected reception signal RX1 or RX2.

At this time, the transmission-side tunable filter 75 and the reception-side tunable filter 76 operate together. Specifically, when the transmission-side tunable filter 75 selects the transmission signal TX1, the reception-side tunable filter 76 selects the reception signal RX1 corresponding to the transmission signal TX1. When the transmission-side tunable filter 75 selects the transmission signal TX2, the reception-side tunable filter 76 selects the reception signal RX2 corresponding to the transmission signal TX2.

Accordingly, when the reception-side tunable filter 76 selects the reception signal RX1, the signals within the frequency bands other than the frequency band Fr1 of the reception signal RX1, which include the transmission signal TX1, are attenuated and removed by the reception-side tunable filter 76. When the reception-side tunable filter 76 selects the reception signal RX2, the signals within the frequency bands other than the frequency band Fr2 of the reception signal RX2, which include the transmission signal TX2, are attenuated and removed by the reception-side tunable filter 76.

The combining portion 11 combines reception signals RX1$n$ and RX2$n$ including the noise signals with the first and second cancel signals NCa and NCb to remove the reflected signal N1 and the leakage signal N2. Accordingly, the reception-side tunable filter 76 is capable of outputting reception signals Rx1 and Rx2, which are substantially equal to the reception signals RX1 and RX2 received by the antenna 4.

As a result, effects and advantages similar to those in the first embodiment can be achieved also in the third embodiment. In particular, since the communication apparatus 71 further includes the transmission-side tunable filter 75 and the reception-side tunable filter 76 in the third embodiment, the communication over a wide range of frequencies is enabled.

Since the transmission-side tunable filter 75 is provided between the dividing portion 7 and the transmission circuit 72, the transmission-side tunable filter 75 is capable of selectively passing the transmission signal within one of the two frequency bands Ft1 and Ft2 even when, for example, the transmission circuit 72 outputs the transmission signals TX1 and TX2 within the two frequency bands Ft1 and Ft2, respectively. Accordingly, the dividing portion 7 does not divide the signals within extra frequency bands, which are not transmitted, to prevent the signals within the extra frequency bands, which are not transmitted, from being mixed into the first and second cancel signals NCa and NCb.

In addition, since the reception-side tunable filter 76 is provided between the combining portion 11 and the reception circuit 73, the reception-side tunable filter 76 is capable of selectively passing the reception signal within one frequency band, which correspond to, for example, the transmission signal within the frequency band selected by the transmission-side tunable filter 75. Accordingly, it is possible to remove the signals within the frequency bands other than the frequency band selected by the reception-side tunable filter 76 to improve an S/N ratio of the reception signals Rx1 and Rx2.

Although the case in which the third embodiment is applied to the first embodiment is exemplified above, the third embodiment may be applied to the second embodiment.

Figure 10:
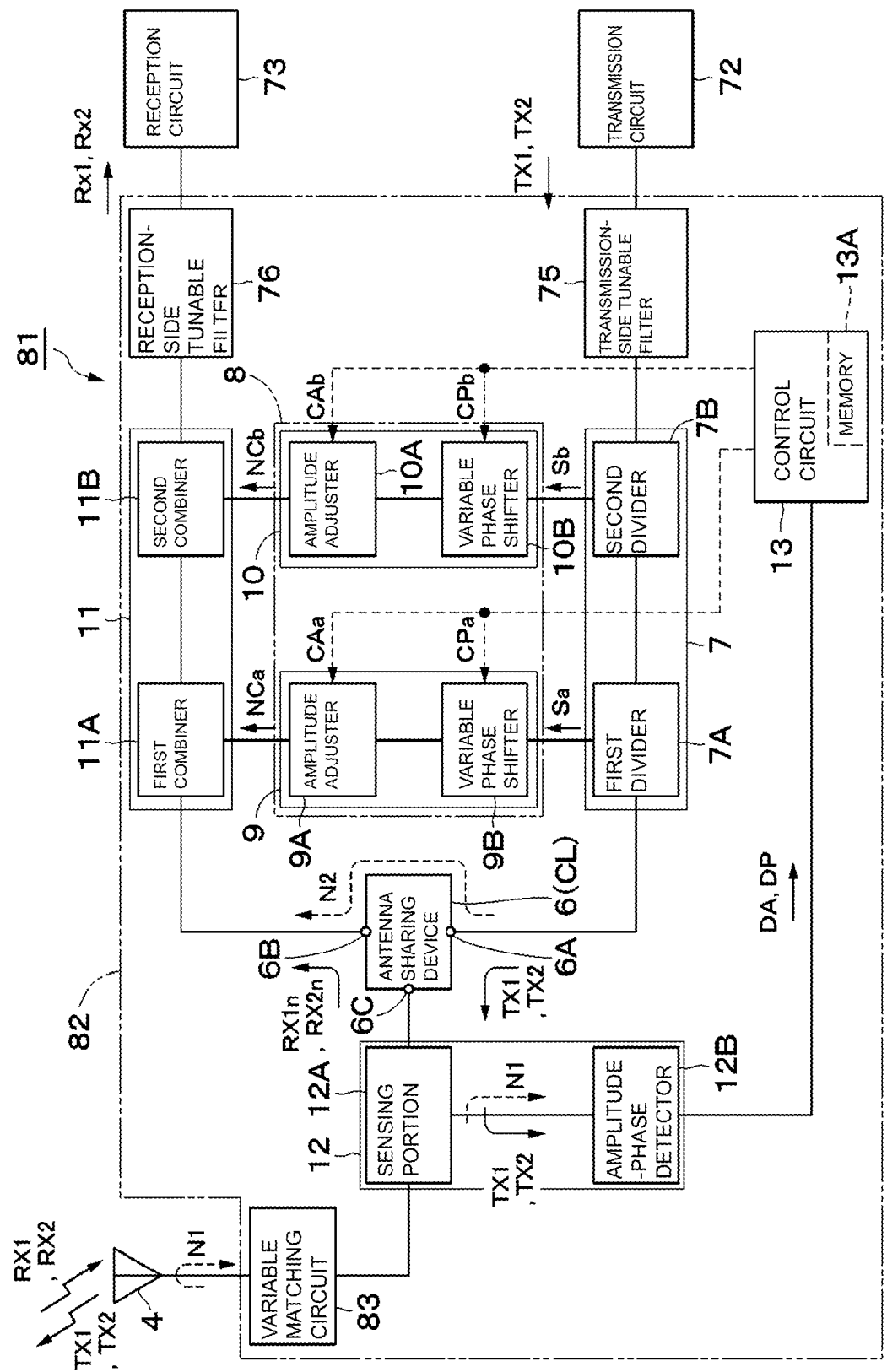
FIG. 10 is a block diagram illustrating a communication apparatus according to a fourth embodiment.

Next, a fourth embodiment of the present invention is illustrated in FIG. 10. The fourth embodiment is characterized in that a communication apparatus further includes a variable matching circuit that variably adjusts the matching with the antenna. The same reference numerals are used in the fourth embodiment to identify the same components in the third embodiment. A description of such components is omitted herein.

A communication apparatus 81 includes the transmission circuit 72, the reception circuit 73, the antenna 4, and a noise cancelling unit 82, substantially as in the communication apparatus 71 according to the third embodiment. However, the noise cancelling unit 82 includes a variable matching circuit 83 provided between the sensing portion 12A and the antenna 4. The fourth embodiment differs from the third embodiment in this point.

The variable matching circuit 83 is composed of, for example, a variable matching device (VMD). The variable matching circuit 83 performs impedance matching between the antenna 4 and the circulator CL functioning as the antenna sharing device 6 in accordance with the variable impedance of the antenna 4.

As a result, effects and advantages similar to those in the third embodiment can be achieved also in the fourth embodiment. In particular, since the variable matching circuit 83 is connected to the antenna 4 in the fourth embodiment, the reflected signal N1 from the antenna 4 can be reduced by the variable matching circuit 83 to reduce the load of the noise cancelling function using the first and second cancel signals NCa and NCb.

Although the case in which the fourth embodiment is applied to the third embodiment is exemplified above, the fourth embodiment may be applied to the first or second embodiment.

Figure 11:
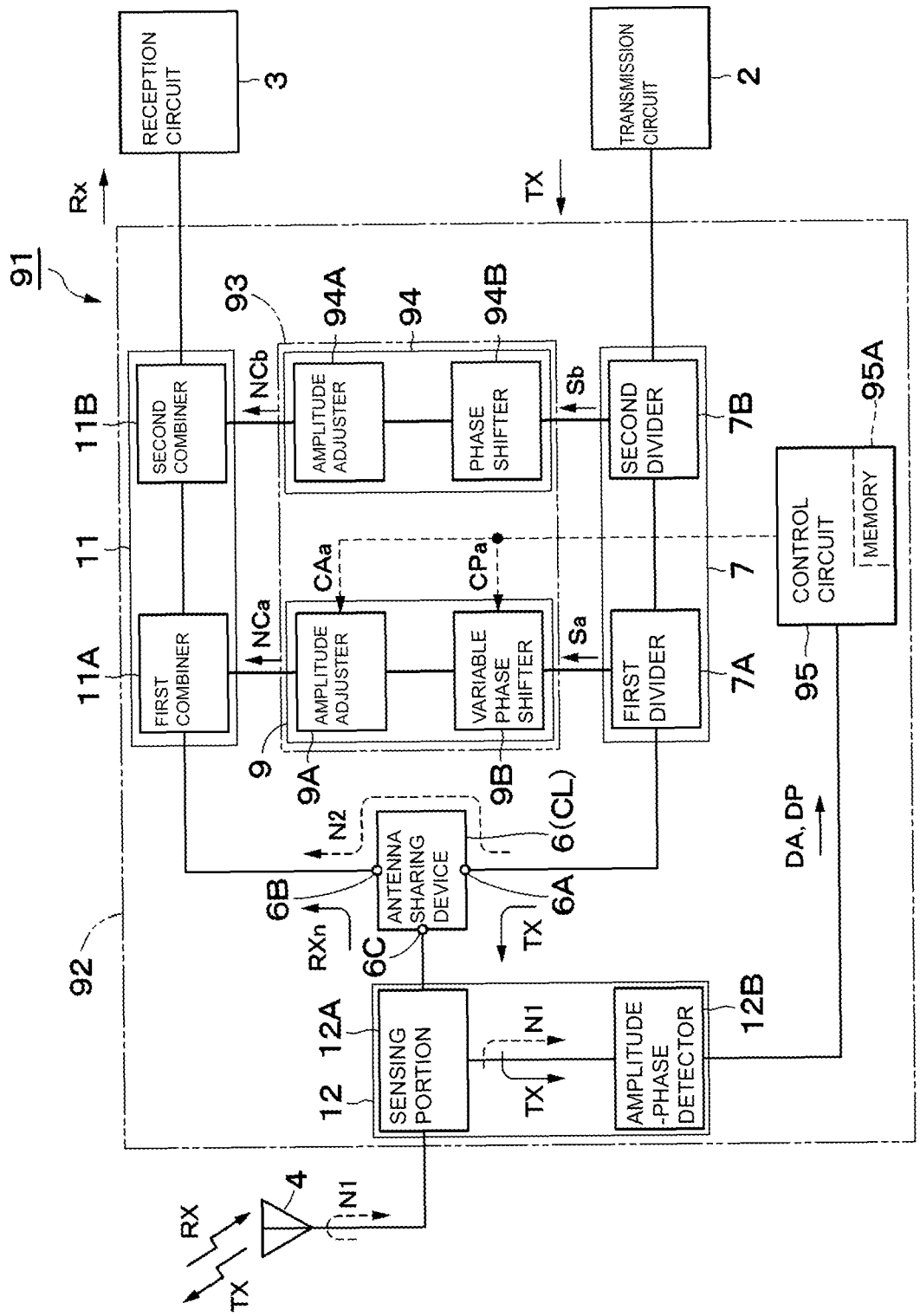
FIG. 11 is a block diagram illustrating a communication apparatus according to a fifth embodiment.

Next, a fifth embodiment of the present invention is illustrated in FIG. 11. The fifth embodiment is characterized in that a control circuit adjusts the amplitude and the phase of the first cancel signal on the basis of the amplitude and the phase of the reflected signal and a second cancel signal output portion outputs the second cancel signal having a predetermined amplitude and a predetermined phase. The same reference numerals are used in the fifth embodiment to identify the same components in the first embodiment. A description of such components is omitted herein.

A communication apparatus 91 includes the transmission circuit 2, the reception circuit 3, the antenna 4, and a noise cancelling unit 92, substantially as in the communication apparatus 1 according to the first embodiment. The noise cancelling unit 92 includes the antenna sharing device 6, the dividing portion 7, a cancel signal output circuit 93, the combining portion 11, the reflected signal detector 12, and a control circuit 95.

The cancel signal output circuit 93 includes the first cancel signal output portion 9 that outputs the first cancel signal NCa and a second cancel signal output portion 94 that outputs the second cancel signal NCb.

The first amplitude-phase adjustment map 14 is stored in a memory 95A in the control circuit 95. Accordingly, the control circuit 95 adjusts the first control signals CAa and CPa on the basis of the detection signals DA and DP so that the first cancel signal NCa has a phase opposite to that of the reflected signal N1 and has the same amplitude as that of the reflected signal N1. The first cancel signal output portion 9 variably adjusts the amplitude and the phase of the first cancel signal NCa on the basis of the amplitude and the phase of the reflected signal N1 and outputs the first cancel signal NCa that has a phase opposite to that of the reflected signal N1 and that has the same amplitude as that of the reflected signal N1.

The control circuit 95 does not supply the control signals to the second cancel signal output portion 94, unlike the control circuit 13 according to the first embodiment. Accordingly, the second cancel signal output portion 94 includes an amplitude adjuster 94A and a phase shifter 94B and adjusts the amplitude and the phase of the second divided signal Sb so that the amplitude and the phase of the second cancel signal NCb have predetermined values. The amplitude and the phase of the second cancel signal NCb are acquired experimentally in consideration of the characteristics of the circulator CL, etc. and are set on the basis of, for example, an average value of the leakage signal N2.

The combining portion 11 combines the first cancel signal NCa variably adjusted on the basis of the reflected signal N1 and the second cancel signal NCb set so as to have a predetermined amplitude and a predetermined phase with the reception signal RXn including the noise signals. As a result, the reflected signal N1 is removed and the leakage signal N2 is reduced, thereby generating the reception signal Rx substantially equal to the reception signal RX received by the antenna 4.

As a result, effects and advantages similar to those in the first embodiment can be achieved also in the fifth embodiment. In addition, the fifth embodiment adopts the configuration in which the first cancel signal output portion 9 outputs the first cancel signal NCa the amplitude and the phase of which are variably adjusted with the first control signals CAa and CPa supplied from the control circuit 95 and the second cancel signal output portion 94 outputs the second cancel signal NCb, which is set so as to have the predetermined amplitude and the predetermined phase. Accordingly, the first cancel signal NCa according to the variation in the reflected signal N1 can be combined with the reception signal RXn including the noise signals even when the reflected signal N1 is greatly varied with the variation in impedance of the antenna 4, thereby removing the reflected signal N1.

Even when the impedance of the antenna 4 is varied, the variation in the leakage signal N2 is smaller than that in the reflected signal N1. Accordingly, the second cancel signal output portion 94 outputs the second cancel signal NCb corresponding to, for example, the average leakage signal N2. Consequently, the combination of the second cancel signal NCb with the reception signal RXn including the noise signals allows the effect of the leakage signal N2 to be reduced.

The second cancel signal output portion 94 outputs the second cancel signal NCb set so as to have the predetermined amplitude and the predetermined phase. Accordingly, it is possible to simplify the configuration and reduce the manufacturing cost, compared with the case in which the amplitude and the phase of the second cancel signal NCb are variably adjusted, as in the second cancel signal output portion 10 according to the first embodiment.

Although the case in which the fifth embodiment is applied to the first embodiment is exemplified above, the fifth embodiment may be applied to any of the second to fourth embodiments.

The fifth embodiment adopts the configuration in which the control circuit 95 does not control the amplitude and the phase of the second cancel signal NCb and only controls the amplitude and the phase of the first cancel signal NCa. However, the present invention is not limited to this configuration. A configuration may be adopted in which the control circuit does not control the amplitude and the phase of the first cancel signal and only controls the amplitude and the phase of the second cancel signal. This configuration is applicable to any of the second to fourth embodiments.

The configuration is adopted in the above embodiments in which the first cancel signal output portion 9 adjusts the amplitude and the phase of the first divided signal Sa to set the first cancel signal NCa. However, the present invention is not limited to this configuration. As in a communication apparatus 101 according to a fifth modification illustrated in FIG. 12, a configuration may be adopted in which a first cancel signal output portion 103 in a noise cancelling unit 102 includes a delay circuit 103C that delays the first divided signal Sa, in addition to an amplitude adjuster 103A and a variable phase shifter 103B.

In this case, the length of the line between the antenna 4 and the sensing portion 12A is long. Accordingly, even if a sufficient delay occurs in the reflected signal N1 only with phase adjustment, the first divided signal Sa is delayed with the delay circuit 103C to allow the first cancel signal NCa that has a phase opposite to that of the reflected signal N1 and that has the same amplitude as that of the reflected signal N1 to be combined with the reception signal RXn including the noise signals. This allows even the reflected signal N1 that is largely delayed to be removed.

The delay circuit 103C may include multiple delay lines having different amounts of delay and a delay line corresponding to the line length to the antenna 4 may be selected from the multiple delay lines. In this case, the noise cancelling unit 102 is applicable to the communication apparatuses 101 of multiple kinds, which have different antennas 4.

Figure 12:
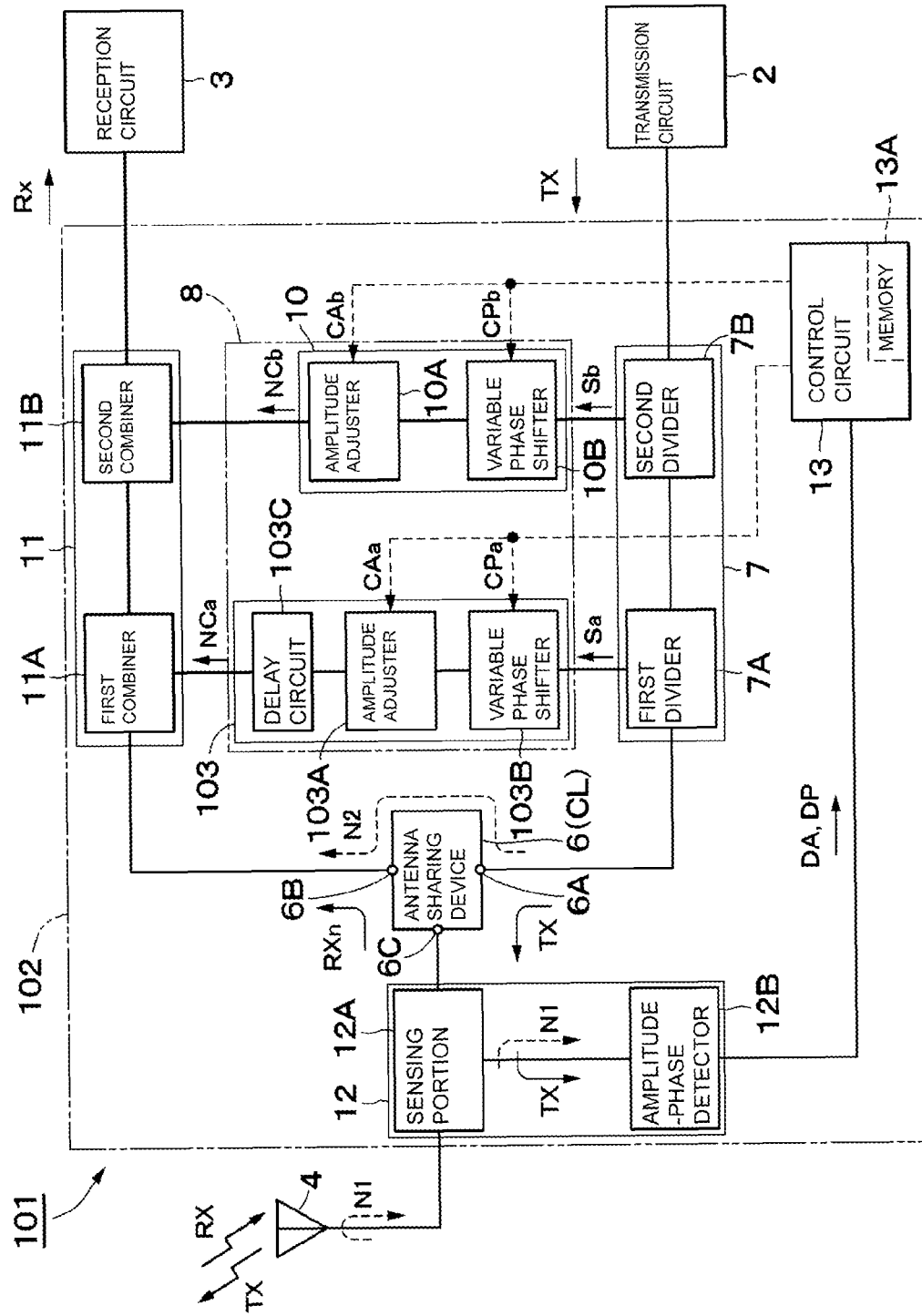
FIG. 12 is a block diagram illustrating a communication apparatus according to a fifth modification.

Although the case is illustrated in FIG. 12 in which the delay circuit 103C is provided between the amplitude adjuster 103A and the first combiner 11A, the delay circuit 103C may be provided between the amplitude adjuster 103A and the variable phase shifter 103B or between the variable phase shifter 103B and the first divider 7A.

Figure 13:
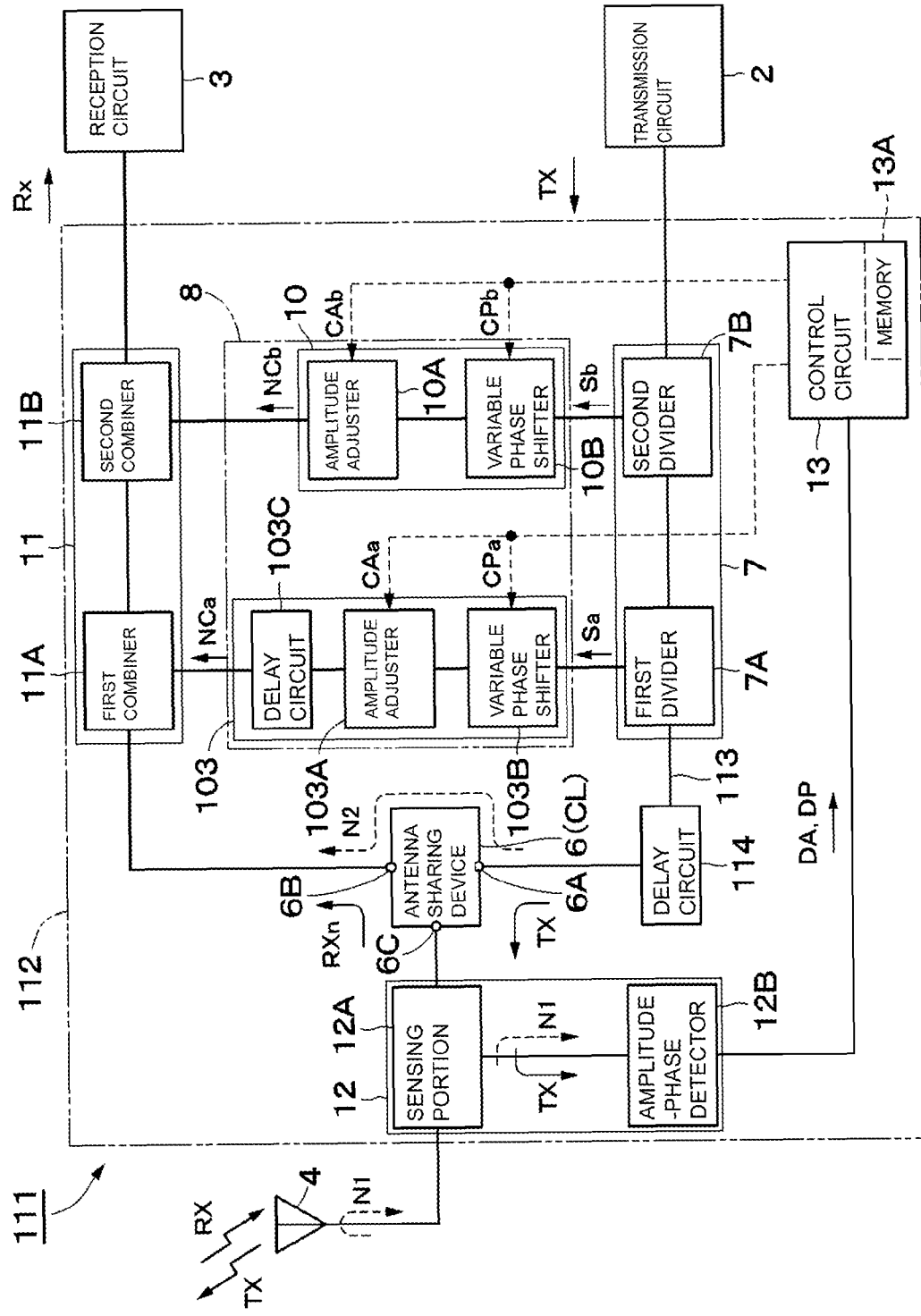
FIG. 13 is a block diagram illustrating a communication apparatus according to a sixth modification.

As in a communication apparatus 111 according to a sixth modification illustrated in FIG. 13, a noise cancelling unit 112 may include another delay circuit 114 on a connection line 113 that connects the dividing portion 7 to the combining portion 11 via the antenna sharing device 6, in addition to the components in the fifth modification.

In this case, even if the first and second cancel signals NCa and NCb are delayed with respect to the reflected signal N1 and the leakage signal N2 of the reception signal RXn due to the amplitude adjusters 103A and 10A and the variable phase shifters 103B and 10B, the transmission signal TX causing the reflected signal N1 and the leakage signal N2 is delayed with the delay circuit 114 to allow the first and second cancel signals NCa and NCb that have phases opposite to those of the reflected signal N1 and the reflected signal N1, respectively, and that have the same amplitudes as those of the reflected signal N1 and the leakage signal N2, respectively, to be combined with the reception signal RXn including the noise signals.

Although the case is illustrated in FIG. 13 in which the delay circuit 114 is provided between the dividing portion 7 and the antenna sharing device 6 on the connection line 113, the delay circuit 114 may be provided at any position on the connection line 113. For example, the delay circuit 114 may be provided between the antenna sharing device 6 and the combining portion 11.

The configuration in the sixth modification includes the other delay circuit 114 provided on the connection line 113 via which the dividing portion 7 is connected to the combining portion 11, in addition to the delay circuit 103C in the first cancel signal output portion 103. However, the present invention is not limited to the above configuration and the sixth modification may be applied to the configuration in which the delay circuit is omitted from the first cancel signal output portion, as in the first to fourth embodiments, or may be applied to any of the first to fourth modifications.

The first and second amplitude-phase adjustment maps 14 and 15 each have the structure including only control values (frequency characteristics information) composed of the amplitudes and the phases of one kind corresponding to the used transmission frequency in the first embodiment described above.

Figure 14:
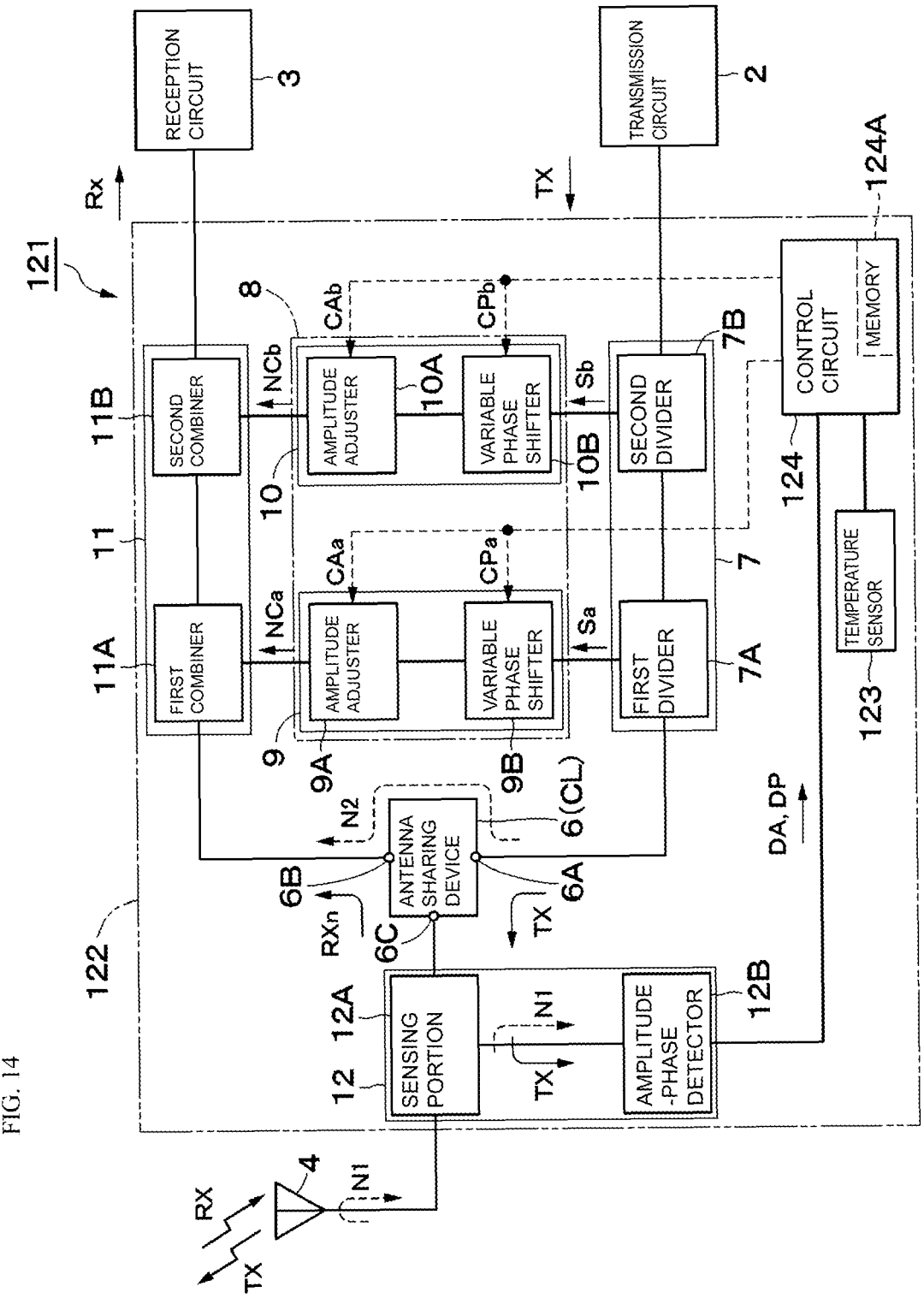
FIG. 14 is a block diagram illustrating a communication apparatus according to a seventh modification.

However, the present invention is not limited to the above structure. As in a communication apparatus 121 according to a seventh modification illustrated in FIG. 14, a noise cancelling unit 122 may include a temperature sensor 123 and temperature characteristics information caused by the temperature at which the communication apparatus 121 is used may be stored in first and second amplitude-phase adjustment maps 125 and 126, in addition to the frequency characteristics information similar to that in the first and second amplitude-phase adjustment maps 14 and 15. The first and second amplitude-phase adjustment maps 125 and 126 are stored in a memory 124A in a control circuit 124.

In this case, the control circuit 124 acquires temperature information including temperatures T1 to T3 from the temperature sensor 123. As illustrated in FIG. 15, in the first amplitude-phase adjustment map 125, the amplitudes of one kind are selected from amplitudes $Aa_{11}$ to $Aa_{1n}$, $Aa_{21}$ to $Aa_{2n}$, and $Aa_{31}$ to $Aa_{3n}$ of three kinds of the first cancel signal NCa depending on the temperature information and the phases of one kind are selected from phases $\theta a_{11}$ to $\theta a_{1m}$, $\theta a_{21}$ to $\theta a_{2m}$, and $\theta a_{31}$ to $\theta a_{3m}$ of three kinds of the first cancel signal NCa depending on the temperature information. As illustrated in FIG. 16, in the second amplitude-phase adjustment map 126, the amplitudes of one kind are selected from amplitudes $Ab_{11}$ to $Ab_{1n}$, $Ab_{21}$ to $Ab_{2n}$, and $Ab_{31}$ to $Ab_{3n}$ of three kinds of the second cancel signal NCb depending on the temperature information and the phases of one kind are selected from phases $\theta b_{11}$ to $\theta b_{1m}$, $\theta b_{21}$ to $\theta b_{2m}$, and $\theta b_{31}$ to $\theta b_{3m}$ of three kinds of the second cancel signal NCb depending on the temperature information.

When the temperature information from the temperature sensor 123 does not coincide with the temperatures T1, T2, nor T3, the values in the first amplitude-phase adjustment map 125 or the second amplitude-phase adjustment map 126 are subjected to interpolation with an interpolation unit provided in the control circuit 124 to calculate the amplitudes and the phases. The temperature information is not limited to the three kinds and the temperature information of two kinds or four kinds may be used.

Variation in characteristics caused by variation in components that are used can occur in each communication apparatus. In consideration of this, the first and second amplitude-phase adjustment maps may be structured so as to include product information of multiple kinds corresponding to the respective communication apparatuses, in addition to the frequency characteristics information. In this case, the product information of one kind matched with the product that is identified is appropriately selected. Alternatively, the first and second amplitude-phase adjustment maps may be structured so as to include all of the frequency characteristics information, the temperature characteristics information, and the product information or may be structured so as to include other information. The control circuit appropriately selects the variety of information described above as needed. These structures are applicable to any of the second to fifth embodiments and are applicable to any of the first to sixth modifications.

Although the case is exemplified in the above embodiments in which the circulator CL is used as the antenna sharing device 6, a configuration may be adopted in which, for example, a duplexer is used as the antenna sharing device.

Although the configurations are exemplified in the third and fourth embodiments described above in which the multiband communication apparatuses 71 and 81 use the transmission signals TX1 and TX2 within the two frequency bands Ft1 and Ft2, respectively, and the reception signals RX1 and RX2 within the two frequency bands Fr1 and Fr2, respectively, the third and fourth embodiments may be applied to a communication apparatus using the transmission apparatuses of three or more frequency bands and the reception apparatuses of three or more frequency bands.

The control circuits 13 and 95 are configured so as to acquire the amplitudes and the phases of the first and second cancel signals NCa and NCb from the detection signals DA and DP using the first and second amplitude-phase adjustment maps 14 and 15 and the control circuit 124 is configured so as to acquire the amplitudes and the phases of the first and second cancel signals NCa and NCb from the detection signals DA and DP using the first and second amplitude-phase adjustment maps 125 and 126 in the above embodiments and the above modifications. However, the present invention is not limited to these configurations. The control circuits may perform a variety of arithmetic processing to the detection signals to acquire the amplitudes and the phases of the first and second cancel signals.

Although the cases are exemplified in the above embodiments and the above modifications in which the transmission-reception apparatus is applied the communication apparatuses 1, 21, 31, 41, 51, 61, 71, 81, 91, 101, 111, and 121, the transmission-reception apparatus may be applied to a radar apparatus. In this case, the frequency band of the transmission signal may be equal to the frequency band of the reception signal.

1, 21, 31, 41, 51, 61, 71, 81, 91, 101, 111, 121 communication apparatus (transmission-reception apparatus)
2, 72 transmission circuit
3, 73 reception circuit antenna
5, 22, 32, 42, 52, 62, 74, 82, 92, 102, 112, 122 noise cancelling unit
6 antenna sharing device
7, 23 dividing portion (dividing unit)
7A first divider
7B second divider
8, 93 cancel signal output circuit
9, 103 first cancel signal output portion
10, 94 second cancel signal output portion
11, 24 combining portion (combining unit)
11A first combiner
11B second combiner
12 reflected signal detector (reflected signal detecting unit)
13, 95, 124 control circuit
23A divider
24A combiner
63, 113 connection line
64 filter circuit
75 transmission-side tunable filter
76 reception-side tunable filter
83 variable matching circuit
103C, 114 delay circuit

The invention claimed is:

1. A transmission-reception apparatus comprising:
a transmission circuit;
a reception circuit;
an antenna;
an antenna sharing device connecting the antenna to the transmission circuit and connecting the antenna to the reception circuit;
a reflected signal detecting unit that is provided between the antenna sharing device and the antenna and that detects a reflected signal of a transmission signal from the antenna, the transmission signal being output from the transmission circuit;
a dividing unit provided between the antenna sharing device and the transmission circuit and that extracts a signal from the transmission signal;
a cancel signal output circuit including a first cancel signal output portion and a second cancel signal output portion, the first cancel signal output portion outputting a first cancel signal used to cancel the reflected signal of the transmission signal from the antenna on the basis of the signal extracted by the dividing unit, and the second cancel signal output portion outputting a second cancel signal used to cancel a leakage signal of the transmission signal from the antenna sharing device based on the signal extracted by the dividing unit;
a combining unit provided between the antenna sharing device and the reception circuit and that combines the first cancel signal and the second cancel signal with a reception signal to be input into the reception circuit; and
a control circuit controlling at least one of the first cancel signal output portion and the second cancel signal output portion,
wherein the control circuit adjusts an amplitude and a phase of at least one of the first cancel signal and the second cancel signal based on an amplitude and a phase of the reflected signal detected by the reflected signal detecting unit.

2. The transmission-reception apparatus according to claim 1,
wherein the control circuit adjusts the amplitude and the phase of the first cancel signal based on the amplitude and the phase of the reflected signal, and
wherein the second cancel signal output portion outputs the second cancel signal that is set so as to have a predetermined amplitude and a predetermined phase.

3. The transmission-reception apparatus according to claim 1,
wherein the dividing unit includes a first divider and a second divider, generates the first cancel signal based on a signal extracted from the transmission signal via the first divider, and generates the second cancel signal based on a signal extracted from the transmission signal via the second divider.

4. The transmission-reception apparatus according to claim 1,
wherein the dividing unit comprises a single divider and generates the first cancel signal and the second cancel signal based on a signal extracted from the transmission signal via the single divider.

5. The transmission-reception apparatus according to claim 1, further comprising:
a transmission-side tunable filter provided between the dividing unit and the transmission circuit and that selectively passes a transmission signal within one frequency band, among the transmission signals within a plurality of frequency bands; and
a reception-side tunable filter provided between the combining unit and the reception circuit and that selectively passes a reception signal within one frequency band, among the reception signals within a plurality of frequency bands.

6. The transmission-reception apparatus according to claim 1, further comprising:
a delay circuit provided on at least one of a connection line connecting the dividing unit to the combining unit through the first cancel signal output portion and a connection line connecting the dividing unit to the combining unit through the antenna sharing device.

7. The transmission-reception apparatus according to claim 1, further comprising:

a filter circuit provided on a connection line connecting the antenna sharing device to the dividing unit.

8. The transmission-reception apparatus according to claim 1,
wherein the antenna sharing device comprises a circulator.

* * * * *

UNITED STATES PATENT AND TRADEMARK OFFICE
CERTIFICATE OF CORRECTION

PATENT NO.         : 9,739,871 B2
APPLICATION NO.    : 14/681163
DATED              : August 22, 2017
INVENTOR(S)        : Hidenori Obiya et al.

It is certified that error appears in the above-identified patent and that said Letters Patent is hereby corrected as shown below:

In the Specification

Column 8, Line 46, replace "$\Theta_n$" with -- $\Theta_m$ --.

Signed and Sealed this
Twenty-fourth Day of April, 2018

Andrei Iancu
*Director of the United States Patent and Trademark Office*